US011130059B2

(12) United States Patent
Nakano et al.

(10) Patent No.: US 11,130,059 B2
(45) Date of Patent: Sep. 28, 2021

(54) GAME SYSTEM AND METHOD OF PROVIDING INFORMATION RELATED TO MATCH-UP GAME

(71) Applicant: BANDAI NAMCO Entertainment Inc., Tokyo (JP)

(72) Inventors: Atsushi Nakano, Tokyo (JP); Sho Aita, Tokyo (JP); Yuki Mizuhori, Tokyo (JP)

(73) Assignee: BANDAI NAMCO Entertainment Inc., Tokyo (JP)

( * ) Notice: Subject to any disclaimer, the term of this patent is extended or adjusted under 35 U.S.C. 154(b) by 0 days.

(21) Appl. No.: 16/727,404

(22) Filed: Dec. 26, 2019

(65) Prior Publication Data

US 2020/0206623 A1 Jul. 2, 2020

(30) Foreign Application Priority Data

Dec. 28, 2018 (JP) .............................. JP2018-247741

(51) Int. Cl.
*A63F 13/525* (2014.01)
*A63F 13/40* (2014.01)
*A63F 13/58* (2014.01)
*A63F 13/35* (2014.01)
(Continued)

(52) U.S. Cl.
CPC ........ *A63F 13/525* (2014.09); *A63F 13/2145* (2014.09); *A63F 13/35* (2014.09); *A63F 13/40* (2014.09); *A63F 13/58* (2014.09); *A63F 13/80* (2014.09); *A63F 2300/64* (2013.01); *A63F 2300/65* (2013.01); *A63F 2300/6653* (2013.01)

(58) Field of Classification Search
None
See application file for complete search history.

(56) References Cited

U.S. PATENT DOCUMENTS

| 2011/0190063 A1* | 8/2011 | Kajii ....................... A63F 13/52 463/42 |
| 2020/0086218 A1* | 3/2020 | Nakano ................... A63F 13/35 |

(Continued)

OTHER PUBLICATIONS

Official site of Playerunknown's Battlegrounds. Retrieved on Sep. 19, 2018. URL: http://pubg.dmm.com/about (and English machine translation). (Discussed on p. 1 of the specification).

(Continued)

*Primary Examiner* — Ronald Laneau
(74) *Attorney, Agent, or Firm* — Posz Law Group, PLC

(57) ABSTRACT

A server sets a game field to a first game area and a second game area in accordance with a progress status of a game, executes display mode control processing of controlling display modes of a first player character who is present in the first game area and a second player character who is present in the second game area, generates image data which visualizes the inside of a virtual space as a game image, which includes a controlled display mode of each player character, and which is for providing a terminal with the game image, wherein in the display mode control processing, the server causes a terminal of a first player to display the second player character in a first display mode, and causes a terminal of a second player to display the first player character in a second display mode that differs from the first display mode.

18 Claims, 16 Drawing Sheets

(51) Int. Cl.
*A63F 13/2145* (2014.01)
*A63F 13/80* (2014.01)

(56) References Cited

U.S. PATENT DOCUMENTS

2020/0206638 A1* 7/2020 Nakano .................. A63F 13/75
2020/0368617 A1* 11/2020 Kando ................ G06F 3/04842

OTHER PUBLICATIONS

Official site of Playerunknown's Battlegrounds. URL: http://pubg.dmm.com/about (and English machine translation).

* cited by examiner

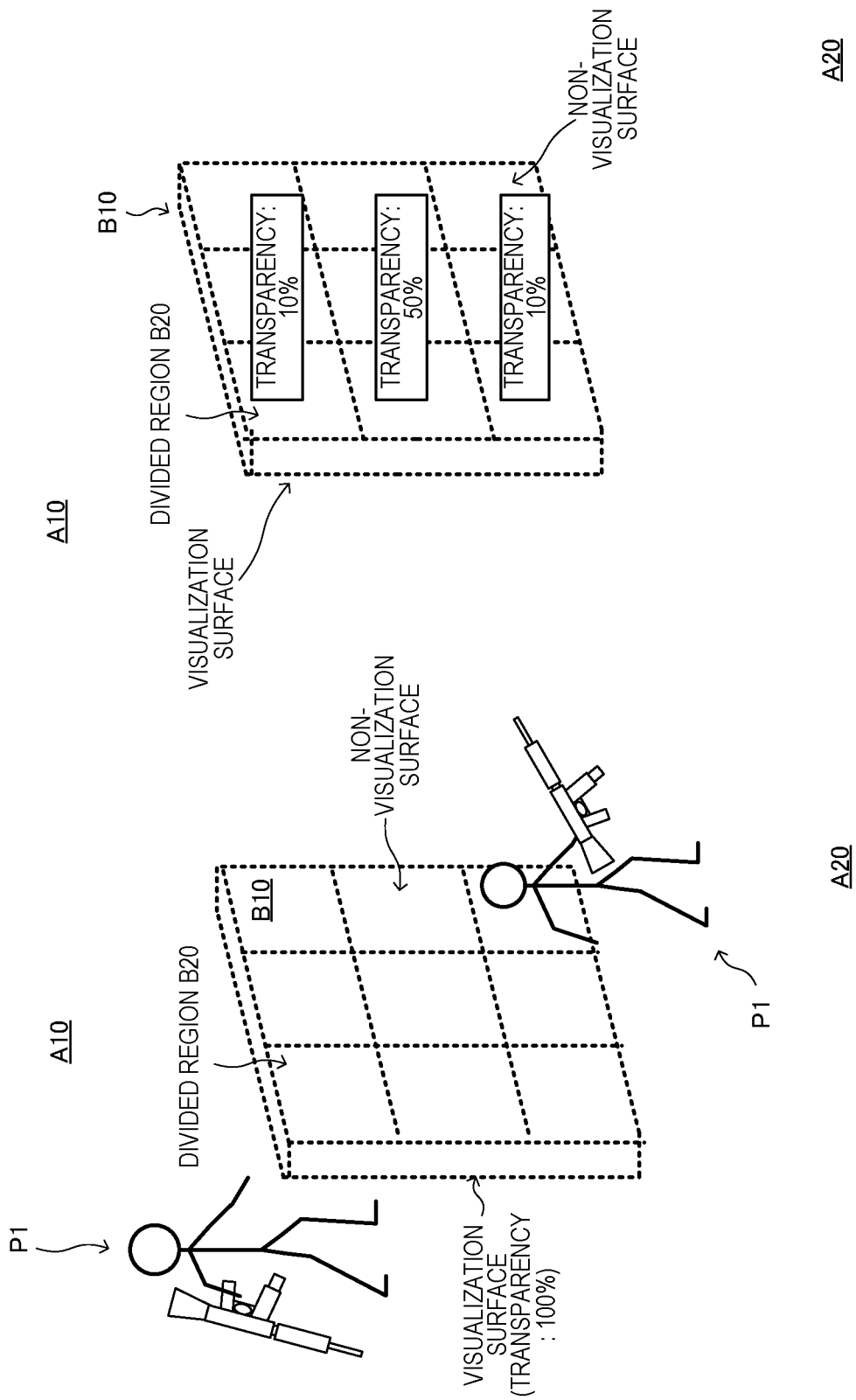

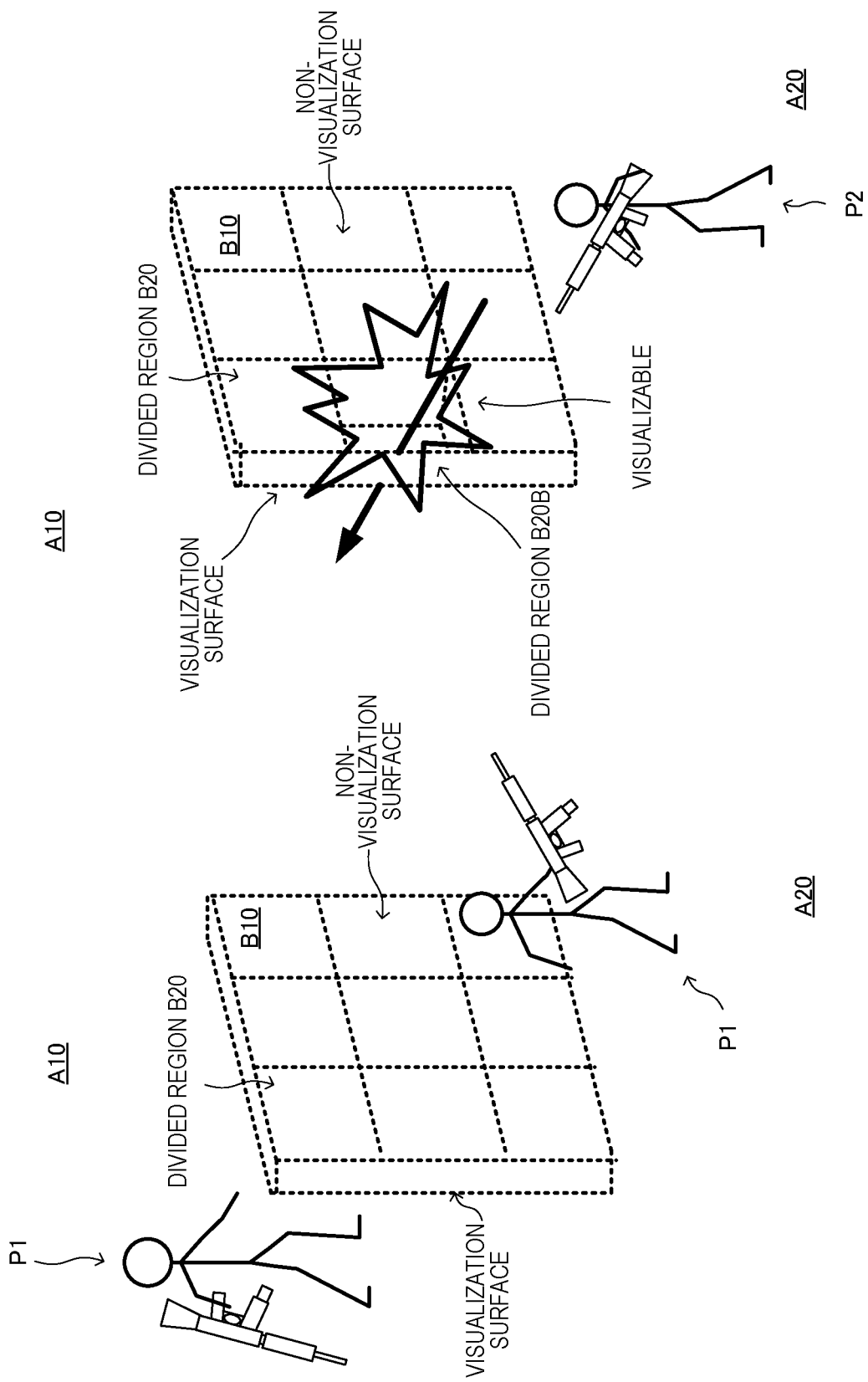

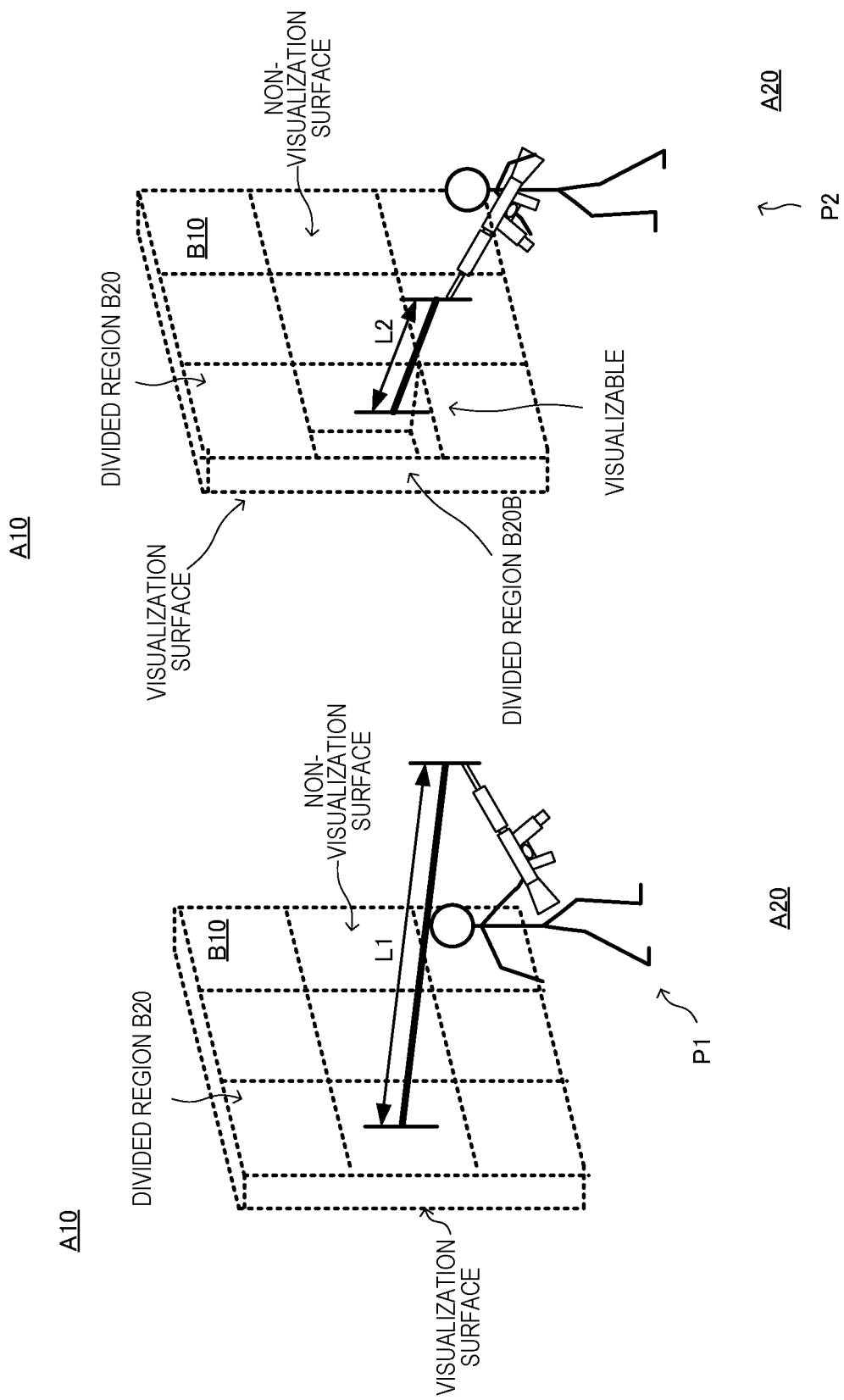

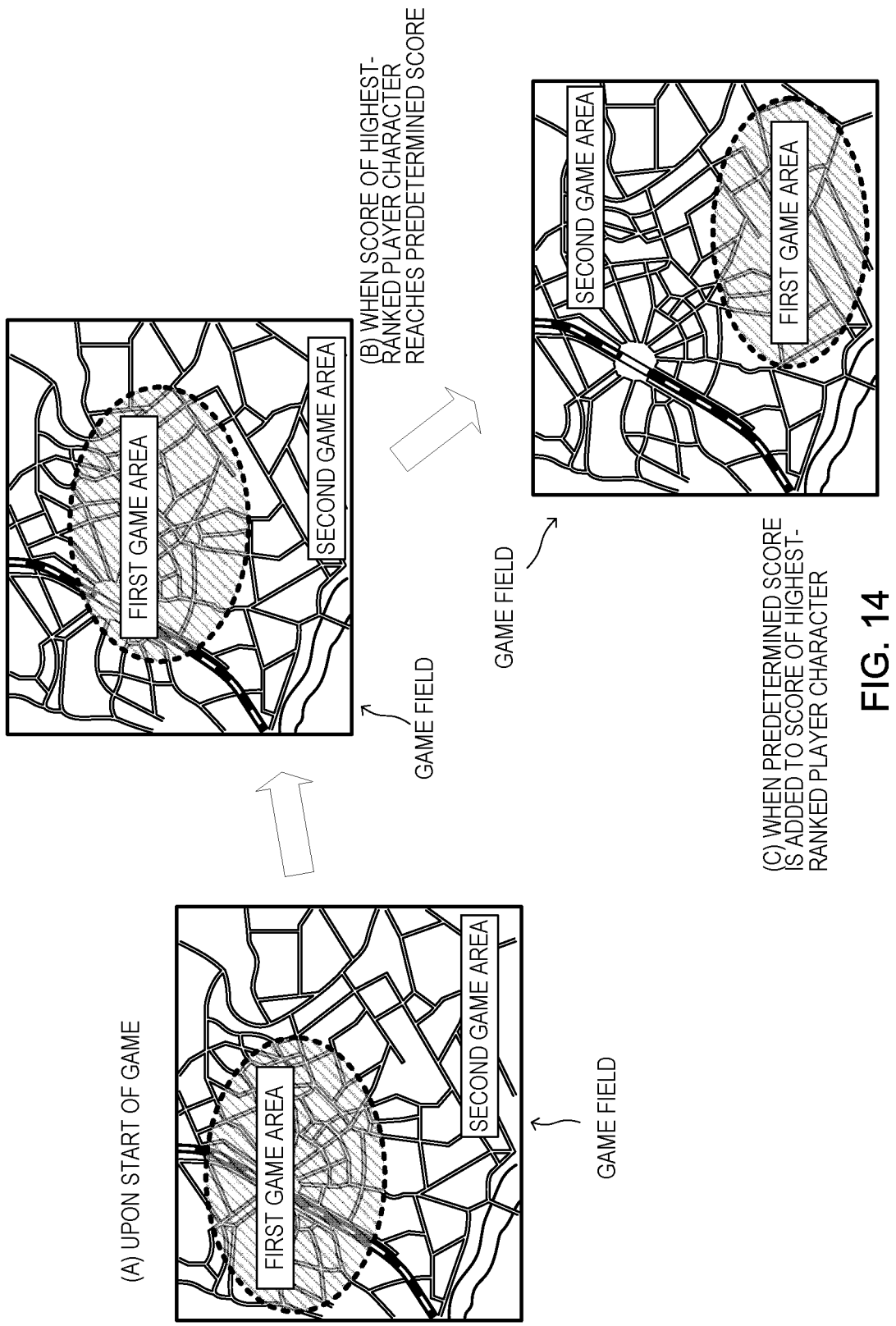

GAME SYSTEM AND METHOD OF PROVIDING INFORMATION RELATED TO MATCH-UP GAME

Japanese Patent Application No. 2018-247741, filed on Dec. 28, 2018, is hereby incorporated by reference in its entirety.

BACKGROUND OF THE INVENTION

The present invention relates to a game system, method of providing information related to match-up game and the like.

Conventionally, action games and shooting games are known, including third-person shooting (TPS) games (third-person shooters) which enable a player to move freely inside a game world or a game space in a game or the like from a third-person perspective of following a player character and fight using a weapon or fight in hand-to-hand combat and first-person shooting (FPS) games (first-person shooters) which enable a player to move freely inside a game world or a game space in a game or the like from a perspective of a player character and fight using a weapon or fight in hand-to-hand combat.

In addition, such games include many match-up games that are executed by a plurality of players or teams in a battle royal format where whichever player or team has managed to continue the game the longest is recognized as a winner.

In particular, recently, match-up games in a battle royal format are known which provide, for the purpose of creating many opportunities of match-ups between individuals or teams and invigorating the game, a penalty area in which a penalty is imparted with the passage of time to a player who stays in the area and inflicts damage on the player, in which case the penalty area expands while an area where players can engage in battle decreases (for example, official site of PLAYERUNKNOWN'S BATTLEGROUNDS [retrieved Sep. 19, 2018], URL: http://pubg.dmm.com/about).

However, with the game system described on the official site of PLAYERUNKNOWN'S BATTLEGROUNDS described above, while the game system is conducive to creating opportunities of match-ups and invigorating the game, there is room for improvement in terms of a novel game element.

SUMMARY

The invention can provide a game system and the like which enable various strategies to be implemented in a match-up game while creating opportunities of match-ups and invigorating the game and which is capable of enhancing the game's appeal by expanding its range of entertainment.

According to a first aspect of the invention, there is provided a game system which executes a match-up game between players using a plurality of player characters in a game field formed in a virtual space and which provides a terminal with information related to the match-up game, the game system including a processor, programmed to:

set the game field to a first game area and a second game area that differs from the first area in accordance with a progress status of the game;

control a first display mode and a second display mode when a first player character who is present in the first game area and a second player character who is present in the second game area are visualized;

generate image data for visualizing the virtual space as a game image and for providing the terminal with the game image including the controlled display mode of each of the player characters;

provide the terminal with the generated image data;

execute display mode control processing of causing the terminal of a first player who operates the first player character to display the second player character in the first display mode, and causing the terminal of a second player who operates the second player character to display the first player character in the second display mode that differs from the first display mode.

According to a second aspect of the invention, there is provided a method of setting the game field to a first game area and a second game area that differs from the first area in accordance with a progress status of the game;

controlling a first display mode and a second display mode when a first player character who is present in the first game area and a second player character who is present in the second game area are visualized;

generating image data for visualizing the virtual space as a game image and for providing the terminal with the game image including the controlled display mode of each of player characters providing the terminal with the generated image data; and executing display mode control processing of causing the terminal of the first player who operates the first player character to display the second player character in the first display mode, and causing the terminal of the second player who operates the second player character to display the first player character in the second display mode that differs from the first display mode.

According to a third aspect of the invention, there is provided a game system programmed to:

set the game field to a first game area and a second game area that differs from the first area in accordance with a progress status of the game;

control a first display mode and a second display mode when a first player character who is present in the first game area and a second player character who is present in the second game area are visualized;

generate image data for visualizing the inside of the virtual space as a game image and for displaying the game image including the controlled display mode of each player character; displaying the generated image data on display; and executing display mode control processing to display the second player character in the first display mode, and to display the first player character in the second display mode that differs from the first display mode.

BRIEF DESCRIPTION OF THE SEVERAL VIEWS OF THE DRAWING

FIGS. 9A and 9B are, respectively, diagrams for explaining the display mode control processing (arrangement control and characteristic control of a boundary object) according to the embodiment of the invention.

FIGS. 12A and 12B are, respectively, diagrams for explaining display mode control processing based on interference with a divided region of a boundary object according to a modification of the embodiment of the invention.

FIGS. 13A and 13B are, respectively, diagrams for explaining display mode control processing based on interference with a divided region of a boundary object according to the modification of the embodiment of the invention.

FIG. 14 is a diagram for explaining game area setting processing (movement) that is executed in accordance with a progress status of a game according to a modification of the embodiment of the invention.

Figure 1:
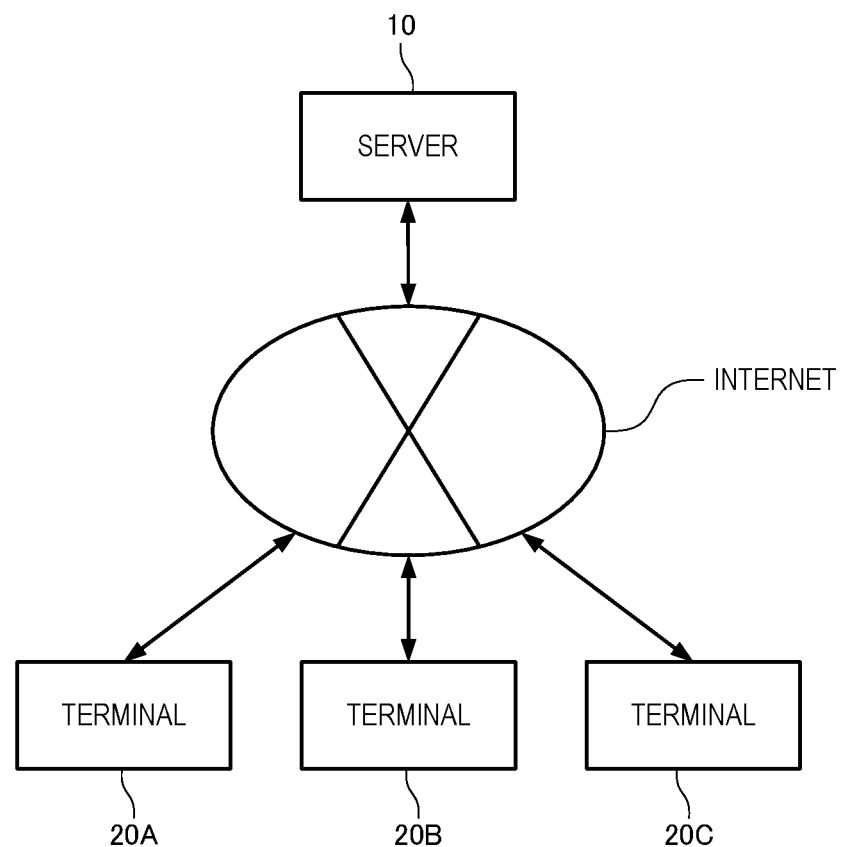
FIG. 1 is a diagram illustrating an example of a system configuration representing a configuration of a game system according to an embodiment of the invention.

DETAILED DESCRIPTION OF THE EMBODIMENT (1) According to an embodiment of the invention, there is provided a game system which executes a match-up game between players using a plurality of player characters in a game field formed in a virtual space and which provides a terminal with information related to the match-up game, the game system including a processor programmed to;

set the game field to a first game area and a second game area that differs from the first area in accordance with a progress status of the game;

control a first display mode and a second display mode when a first player character who is present in the first game area and a second player character who is present in the second game area are visualized;

generate image data for visualizing the virtual space as a game image and for providing the terminal with the game image including the controlled display mode of each of the player characters;

provide the terminal with the generated image data; execute display mode control processing of causing the terminal of a first player who operates the first player character to display the second player character in the first display mode, and causing the terminal of a second player who operates the second player character to display the first player character in the second display mode that differs from the first display mode.

The game system described above is capable of changing, as a result of an acquisition of an item or an improvement of skill level, a display mode of each player character which is reflected in accordance with a progress status of a game or an intention of an operation by a player to a display mode that is advantageous or disadvantageous to the player in accordance with whether the player character is present in a first game area or a second game area as well as a type of a player to be provided with a game image including the player character.

For example, when displaying a second player character who is present in the second game area such as a penalty area on a terminal of a first player, the game system described above displays the second player character so as to be visible to the first player or highlights the second player character, but when displaying a first player character who is present in an area outside of a penalty area such as a first game area on a terminal of a second player, the game system sets the first player character so as to be unrecognizable to the second player or displays the first player character so that recognition thereof is difficult.

In other words, for example, by controlling the display mode of a player character who is present in the second game area that is a penalty area or the like to a display mode that imparts a disadvantage to the player character, the game system described above is capable of psychologically inducing the player character to avoid staying inside the penalty area and guiding the player character to the first game area that is outside of the penalty area or the like.

Therefore, for example, since gradually decreasing the first game area enables a range of activity of a player character to be narrowed and, consequently, a large number of match-up opportunities between player characters can be created, the game system described above can invigorate a game and enhance an entertainment level thereof by controlling display modes based on areas.

In addition, in the game system described above, since the second player character displayed on the terminal of the first player and the first player character displayed on the terminal of the second player only differ from each other in their display modes, for example, even when a disadvantage is imposed by a display mode, the player character is allowed to remain present in the second game area.

In other words, in the game system described above, for example, an attack can be deliberately launched from the second game area while enjoying the disadvantage based on being present in the second game area instead of being uniformly moved to the first game area.

Therefore, since the game system described above enables each player to construct a game strategy with a high degree of freedom including implementing a match-up using the second game area, a range of entertainment when playing the game can be expanded and the game's appeal can be enhanced.

It should be noted that examples of the "progress status of the game" include respective elements related to game progress such as a time element indicating an elapsed time from the start of the game as well as non-time elements like a record of a player character (a player who operates and controls the player character), a match-up record such as results of match-ups with other player characters in the case of a game involving match-ups between player characters, the number of remaining player characters or a remaining stamina level of each player character, and a positional relationship with a game field of each player character.

In addition, "visualizing the inside of the virtual space as a game image" means, for example, visualizing an imaging range from the perspective of a virtual camera arranged inside the virtual space.

On the other hand, in addition to visualizing or non-visualizing a player character, "display modes" include highlighting such as luminous display or contour enhancement and special display such as enlargement (for example, display using aim-assist).

It should be noted that examples of the "progress status of the game" include respective elements related to game progress such as a time element indicating an elapsed time from the start of the game as well as non-time elements like a record of a player character (a player who operates and controls the player character), a match-up record such as results of match-ups with other player characters in the case of a game involving match-ups between player characters, the number of remaining player characters or a remaining stamina level of each player character, and a positional relationship with a game field of each player character.

In addition, "visualizing the inside of the virtual space as a game image" means, for example, visualizing an imaging range from the perspective of a virtual camera arranged inside the virtual space.

On the other hand, in addition to visualizing or non-visualizing a player character, "display modes" include highlighting such as luminous display or contour enhancement and special display such as enlargement (for example, display using aim-assist).

(2) In the game system described above, the processor may be is programmed to cause the terminal of the first player or the terminal of the second player to display a third player character who differs from both the first player character and the second player character in a third display mode that differs from both the first display mode and the second display mode.

For example, the game system described above can execute a display mode that differs from the display modes of the first player character and the second player character with respect to a third player character who is another player character being present in the first game area or another player character being present in the second game area.

For example, when the third player character is present in the first game area, the game system described above causes the terminal of the first player to display the third player character in a display mode that reflects an intention of a player who operates the third player character in accordance with game progress (a display mode that is set solely by an operation of a player and a display mode that has not been subject to processing other than the setting based on an operation of the player or, in other words, a normal display mode without special display processing which is displayed in accordance with a game environment).

In addition, when the third player character is present in the second game area, the first player can be provided with the third player character in a display mode which imposes a disadvantage similar to the second player character and which differs from the display mode of the second player character.

Furthermore, when the third player character is present in the first game area, the first player can be provided with the third player character in a display mode which does not impose a disadvantage unlike the display mode of the second player character.

Therefore, since the game system described above can execute a match-up in a normal state when a player character is present in an area outside of a penalty area such as the first game area, each player character can be induced to avoid staying inside the penalty area and guided to the first game area that is outside of the penalty area or the like.

It should be noted that the "third player character" may be a player character who is present in the first game area or a player character who is present in the second game area.

(3) In the game system described above, the processor is programmed to arrange and control a boundary object at a boundary between the first game area and the second game area, and when at least one of the first player character and the second player character in the virtual space is visualized through the boundary object, the processor is programmed to change characteristics of the boundary object on a boundary surface to control the display mode of the first player character, the second player character, or both the first player character and the second player character in accordance with a type of the first game area in which the first player character to be visualized is present or the second game area in which the second player character to be visualized is present and whether the player is the first player or the second player who uses the terminal to be provided with a visualized game image.

Since the game system described above is capable of realizing control of a display mode of a player character using a concept of an object constructing a game space, a player character who is present in the second game area can be left with a disadvantage or a player character who is present in the first game area can be left with an advantage without having to perform complicated processing.

It should be noted that the "boundary object" has characteristics for controlling a display mode of a player character inside a virtual space when, for example, the player character is visualized through the boundary object by a virtual camera or the like.

In addition, examples of "characteristics of the boundary object on a boundary surface" include transparency of a boundary surface between the first game area and the second game area, a color (RGB) of the boundary surface, and characteristics for highlighting a target object itself or a contour thereof when visualizing the object via the boundary surface.

Furthermore, with respect to characteristics of the boundary surface, the boundary surface may have one characteristic as a whole or the boundary surface may be formed by a plurality of divided regions and the characteristics may be controlled by controlling each divided region.

(4) In the game system described above, a surface along the boundary surface between the first game area and the second game area of the boundary object is formed by a plurality of divided regions, and the processor is programmed to, when at least one of the first player character and the second player character in the virtual space is visualized through the boundary object, change characteristics of the boundary object by controlling each divided region in accordance with whether the player character is the first player character or the second player character to be visualized and whether the player is the first player or the second player who uses a terminal to be provided with the visualized game image.

For example, since the game system described above is capable of individually controlling a divided region in accordance with an operation based on a player or changing a display mode for each portion of a player character such as always applying the display mode to only a part of the divided regions, a display mode can be interlocked with a match-up game in a change of an individual divided region and a game element can also be incorporated into the display mode of a player character.

It should be noted that "controlling each divided region" means, for example, setting a parameter for each divided region and controlling each divided region by controlling each parameter in accordance with a type of the player character to be visualized and a type of a player who uses a terminal to be provided with a visualized game image.

In particular, "control of a divided region" includes control of transparency (grayscale), control of color (RGB), control of size, and control of shape, and in place thereof or in addition thereto, highlighting of an object (including a player character) to be a target object itself or a contour of the object in accordance with a type of the object for each divided region.

(5) In the game system described above,
the processor may be programmed to
detect interference in each divided region of the first player or the second player, or an environment of the game in progress, and
individually controls characteristics of each divided region based on the detected interference of the player or the detected environment of the game.

The game system described above is capable of individually controlling a divided region or controlling only a part of the divided regions in accordance with an operation based on a player or in accordance with an environment of the game space.

For example, in the game system described above, in the case of a penalty such as making the first player character visually unrecognizable with respect to a player of a player character who is present in a game area such as the second game area that is a penalty area, the display mode of the first player character who is visually unrecognizable can be changed to a player character who is visually recognizable by having the divided regions be attacked or destroyed based on an attack by the second player character.

In addition, in the case of a penalty with respect to such a player, the game system described above is capable of controlling each divided region based on the environment of the game in progress such as a status of weather or lighting of the game space and changing the display mode of the first player character who is visually unrecognizable to a player character who is visually recognizable.

Therefore, even with respect to control of a display mode based on a type of a player character, since the game system described above is capable of executing control in accordance with an operation of a player of an environment of a game in progress, a game element can also be incorporated into display control processing.

It should be noted that examples of "interference of the player" includes an action that changes characteristics of a boundary object or a part thereof due to the following or to a history of the action:

(A1) in addition to actions that damage the boundary object or a part thereof by a contact or an attack on the boundary object or a part thereof by a player character himself/herself or a contact or an attack using an item, non-physical interference with the boundary object using magic or the like;

(A2) an approach by a player character to a boundary (in other words, a distance between a boundary object and the player character);

(A3) a change in an environment (in other words, an environment parameter) of a periphery of a specific boundary object in conjunction with an action by a player character such as a case where the player character penetrates into the second game area from the first game area, the player character continuously remains in the second game area, and night falls in the game space; and (A4) a change in a parameter set in advance related to a boundary object in relation to an action (in particular, a movement) of a player character such as a case where a parameter set to the boundary object changes due to the player character repetitively penetrating into the second game area from the first game area via a same boundary area (which may be same coordinates or a predetermined coordinate range that is regarded to be the same in a game space).

In addition, the "progress status of the game" includes values of parameters such as stamina of a player character who is a visualization object or a player character operated by a player who is a provision object, weather (sunny, rain, or the like) of a game field, and brightness of the game field (presence or absence of indoor lighting or a time slot such as morning, afternoon, or night).

Furthermore, "characteristics of a divided region" include transparency (grayscale), color (RGB), size, shape, and characteristics for highlighting of an object (including a player character) to be a target object itself or a contour of the object in accordance with a type of the object.

(6) In the game system described above,
the processor is programmed to control the first display mode by superimposing a marking object for marking the second player character on the second player character when visualizing the second player character.

Since the game system described above is capable of realizing control of a display mode of a player character by image processing such as marking, a player who is present in the second game area can be left with a disadvantage by a display mode without performing complicated processing.

It should be noted that, for example, the "marking object" may simply be an object like a luminous body or an object for displaying information related to a parameter (such as a stamina level), information related to the number of lives or the number of remaining units, or information related to characteristics of a player or a player character such as equipment, items, and capabilities.

(7) According to an embodiment of the invention, there is provided a method of executing a match-up game between players using a plurality of player characters in a game field formed in a virtual space and providing a terminal with information related to the match-up game, the method comprising:

setting the game field to a first game area and a second game area that differs from the first area in accordance with a progress status of the game;

controlling a first display mode and a second display mode when a first player character who is present in the first game area and a second player character who is present in the second game area are visualized;

generating image data for visualizing the virtual space as a game image and for providing the terminal with the game image including the controlled display mode of each of player characters providing the terminal with the generated image data; and executing display mode control processing of causing the terminal of the first player who operates the first player character to display the second player character in the first display mode, and causing the terminal of the second player who operates the second player character to display the first player character in the second display mode that differs from the first display mode.

The method of providing information related to a match-up game described above is capable of changing, as a result of an acquisition of an item or an improvement of skill level, a display mode of each player character which is reflected in accordance with a progress status of a game or an intention of an operation by a player to a display mode that is advantageous or disadvantageous to the player in accordance with whether the player character is present in a first game area or a second game area as well as a type of a player to be provided with a game image including the player character.

Therefore, for example, since gradually decreasing the first game area enables a range of activity of a player character to be narrowed and, consequently, a large number of match-up opportunities between player characters can be created, the method of providing information related to a match-up game described above can invigorate a game and enhance an entertainment level thereof by controlling display modes based on areas.

(8) According to an embodiment of the invention, there is provided a game system which executes a match-up game between players using a plurality of player characters in a game field formed in a virtual space, the game system including a processor programmed to:

set the game field to a first game area and a second game area that differs from the first area in accordance with a progress status of the game;

control a first display mode and a second display mode when a first player character who is present in the first game area and a second player character who is present in the second game area are visualized;

generate image data for visualizing the inside of the virtual space as a game image and for displaying the game image including the controlled display mode of each player character; displaying the generated image data on display; and executing display mode control processing to display the second player character in the first display mode, and to display the first player character in the second display mode that differs from the first display mode.

The game system described above is capable of changing, as a result of an acquisition of an item or an improvement of skill level, a display mode of each player character which is reflected in accordance with a progress status of a game or an intention of an operation by a player to a display mode that is advantageous or disadvantageous to the player in accordance with whether the player character is present in a first game area or a second game area as well as a type of a player to be provided with a game image including the player character.

Therefore, for example, since gradually decreasing the first game area enables a range of activity of a player character to be narrowed and, consequently, a large number of match-up opportunities between player characters can be created, the game system described above can invigorate a game and enhance an entertainment level thereof by controlling display modes based on areas.

Embodiments of the invention are described in detail below. It is noted that the following embodiments do not unduly limit the scope of the invention as stated in the claims. In addition, all of the components described in the following embodiments are not necessarily essential requirements of the invention.

1. Game System

First, an overview and a general configuration of a game system 1 according to an embodiment of the invention will be described with reference to FIG. 1. FIG. 1 is a diagram illustrating an example of a system configuration representing a configuration of the game system 1.

In the game system 1, as illustrated in FIG. 1, a server 10 which provides a game service and a terminal 20 (for example, terminals 20A, 20B, and 20C) are configured to be connectable to the Internet (an example of a network).

By accessing the server 10 from the terminal 20, a user can play a game being transmitted from the server 10 via the Internet. Furthermore, by accessing the server 10 from the terminal 20, the user can communicate with other users.

The server 10 is an information processing apparatus capable of providing a service that enables users to play a game using the terminal 20 connected to the server 10 via the Internet so as to be capable of communicating with the server 10. In addition, the server 10 may function as an SNS server which provides a communication-type service. In this case, an SNS server may be an information processing apparatus which provides a service that enables a plurality of users to communicate with each other.

Furthermore, for example, when the server 10 functions as an SNS server, the server 10 is capable of providing a game referred to as a social game which is executed using an operating environment (an application programming interface (API), a platform, or the like) of the SNS to be provided.

In particular, the server 10 is capable of providing games provided on a web browser of the terminal 20 including browser games (games which start by simply opening an installation site with a web browser) created in various languages such as HTML, FLASH, CGI, PHP, shockwave, a Java (registered trademark) applet, and JavaScript (registered trademark).

Social games differ from existing online games in that dedicated client software is not required, and include games that can be played with only a web browser and an SNS account. In addition, the server 10 is configured to be capable of being connected to a terminal (a smart phone, a personal computer, a game device, or the like) of another user via a network and providing an online game which enables a same game progress to be simultaneously shared online.

Meanwhile, the server 10 may be constituted by one (apparatus or processor) or a plurality of (apparatuses or processors).

In addition, information such as billing information and game information stored in a storage area (a storage unit 140 to be described later) of the server 10 may be stored in a database (a storage apparatus or a memory in a broad sense) connected via a network (an intranet or the Internet) or, when the server 10 functions as an SNS server, information such as a player information storage unit 146 stored in the storage area may be stored in a database (a storage apparatus or a memory in a broad sense) connected via a network (an intranet or the Internet).

Specifically, the server 10 is configured to receive input information based on an operation by a user (in other words, a player executing a game) of the terminal 20 and to perform game processing based on the received input information. In addition, the server 10 is configured to transmit a game processing result to the terminal 20, and the terminal 20 is configured to perform various types of processing so as to provide the game processing result received from the server 10 on the terminal 20 so as to be viewable for the user.

The terminal 20 is an information processing apparatus such as an image generating apparatus including a smart phone, a mobile phone, a PHS, a computer, a game apparatus, a PDA, and a mobile game device, and is capable of being connected to the server 10 via a network such as the Internet (a WAN) or a LAN. A communication line between the terminal 20 and the server 10 may be either wired or wireless.

In addition, the terminal 20 is provided with a web browser capable of viewing web pages (data in an HTML format). In other words, the terminal 20 is equipped with a communication control function for communicating with the server 10, a web browser function for performing display control using data (web data, data created in the HTML format, and the like) received from the server 10 and transmitting data of a user's operation to the server 10, and the like, and is configured to execute various types of processing in order to provide the user with a game screen and enable the user to execute a game. However, the terminal 20 may acquire game control information provided by the server 10 and execute predetermined game processing, and execute a game based on the game processing.

Specifically, when the terminal 20 makes a request to perform a predetermined game to the server 10, the terminal 20 is connected to a game site of the server 10 and a game is started. In particular, by using an API as necessary, the terminal 20 is configured to cause the server 10 functioning as an SNS server to perform predetermined processing or acquire the player information storage unit 146 managed by the server 10 functioning as an SNS server to execute a game.

2. Server

Figure 2:
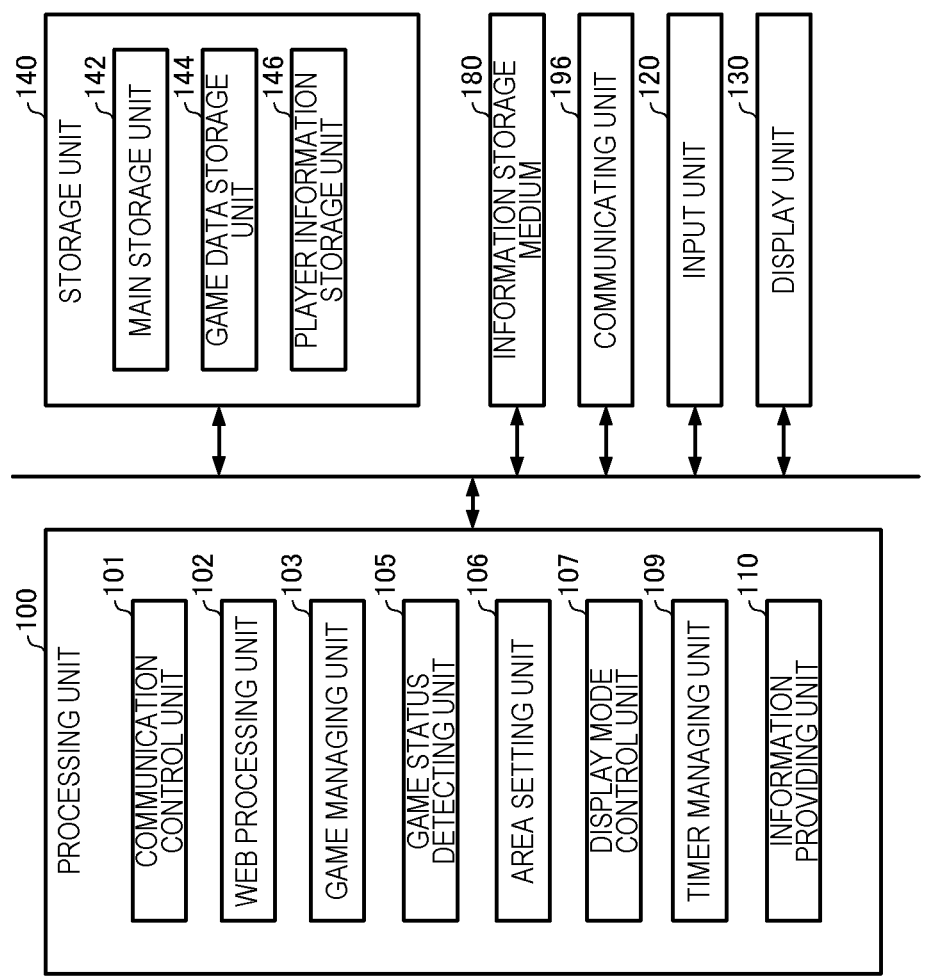
FIG. 2 is a diagram illustrating functional blocks of a server according to the embodiment of the invention.

Next, the server 10 will be described with reference to FIG. 2. Moreover, FIG. 2 is a diagram illustrating functional blocks of the server 10. Alternatively, the server 10 may be configured by omitting a part of the components (units) illustrated in FIG. 2.

The server 10 includes an input unit 120 used by an administrator or the like for input, a display unit 130 which performs predetermined display, an information storage medium 180 storing predetermined information, a communicating unit 196 for communicating with the terminal 20 and the like, a processing unit 100 which executes processing mainly related to a game to be provided, and the storage unit 140 storing a variety of data mainly used in the game.

The input unit 120 is used by a system administrator and the like to input settings related to a game and other necessary settings and to input data. For example, the input unit 120 is constituted by a mouse, a keyboard, or the like.

The display unit 130 is for displaying an operation screen for the system administrator. For example, the display unit 130 is constituted by a liquid crystal display or the like.

The information storage medium 180 (a computer-readable medium) stores a program, data, and the like, and a function of the information storage medium 180 is constituted by an optical disk (a CD or a DVD), a magneto-optical disk (MO), a magnetic disk, a hard disk, a magnetic tape, a memory (a ROM), or the like.

The communicating unit 196 performs various control for communicating with the outside (for example, a terminal, another server, or another network system), and a function of the communicating unit 196 is constituted by various processors, hardware such as a communication ASIC, a program, or the like.

The storage unit 140 serves as a work area for the processing unit 100, the communicating unit 196, and the like, and a function of the storage unit 140 is constituted by a RAM (VRAM) or the like. Moreover, information stored in the storage unit 140 may be managed by a database.

Furthermore, in addition to a main storage unit 142, the storage unit 140 has a game data storage unit 144 which stores game information indicating information related to a game and the player information storage unit 146 which stores player information indicating information related to each player and information related to the game of a player (hereinafter, referred to as "player-related information").

In particular, the game data storage unit 144 stores information on a game field where the game is carried out, condition information used to make various determinations, information on each object on the game field, information for changing each object, various table information, information related to a player character of each player, and the like.

In addition, the player information storage unit 146 stores, for each player, the following:

(A1) a nickname or a player ID of a player and, when the player belongs to a team, a team name or an ID of the team to which the player belongs (hereinafter, referred to as "affiliation information");

(A2) information related to a record of an individual and a team such as current points, acquired awards, or game time (hereinafter, also referred to as "record information");

(A3) characteristics and attributes of a player character and information related to types of items owned by the player character (including capabilities of the items);

(A4) information related to a match-up record such as the numbers of wins and losses against another player character or another team in a match-up game with the other player character or the other team (hereinafter, also referred to as "match-up record information");

(A5) positional information indicating a position of each player or team in a game field or positional history information indicating a history of the position;

(A6) information on a value of a parameter (hereinafter, referred to as an "energy parameter information") which has a direct bearing on whether a player character of each player wins or loses such as an experience value or life energy (herein after, also referred to as "energy parameter value") and information on presence or absence of a loss (whether or not the game is over) (also referred to as "loss information"); and (A7) information related to billing such as a billing history and a billed amount.

It should be noted that that the record information, the match-up record information, and the loss information included in the player information are updated at a timing determined in advance. Examples of the timing determined in advance include every given period (such as every 5 minutes), a timing at which a player logs out, a predetermined time of day (for example, 8:00 AM) in the game, and a timing at which a predetermined event occurs (a timing at which any inter-individual match-up or inter-team match-up ends).

In addition, basically, energy parameter information decreases in real time when interference such as an attack is sustained from another player character during a game and increases in real time when a recovery action such as eating a meal or getting rest is performed. Furthermore, energy parameter information is information which, when a value thereof reaches "0", the game being played by the player is over.

The processing unit 100 performs a variety of processing using the main storage unit 142 inside the storage unit 140 as a work area. Functions of the processing unit 100 can be realized by hardware such as various processors (a CPU, DSP, or the like) and an ASIC (a gate array or the like) or by programs.

The processing unit 100 performs various types of processing based on the program (data) stored in the information storage medium 180. In other words, the information storage medium 180 stores a program that causes a computer to function as each unit (a program which causes a computer to execute processing of each unit) of the present embodiment.

For example, the processing unit 100 (processor) performs, based on a program stored in the information storage medium, overall control of the server 10 as well as a variety of processing including control of delivery of data and the like between the respective units. Furthermore, the processing unit 100 performs processing for providing various services in response to a request from the terminal 20.

Specifically, the processing unit 100 at least includes a communication control unit 101, a web processing unit 102, a game managing unit 103, a movement control unit 104, a game status detecting unit 105, an area setting unit 106, a display mode control unit 107, a timer managing unit 109, and an information providing unit 110.

The communication control unit 101 performs processing for transmitting and receiving data to and from the terminal 20 via the network. In other words, the server 10 performs a variety of processing based on information received by the communication control unit 101 from the terminal 20 and the like. In particular, the communication control unit 101 performs processing for transmitting, based on a request from the terminal 20 of a player, a game screen to the terminal 20 of the player.

The web processing unit 102 functions as a web server. For example, the web processing unit 102 performs, through a communication protocol such as Hypertext Transfer Protocol (HTTP), processing for transmitting data in response to a request by a web browser 211 installed on the terminal 20 and processing for receiving data transmitted by the web browser 211 of the terminal 20.

Moreover, while a case where the server 10 is also provided with a function as an SNS server will be described as an example according to the present embodiment, the server 10 may be separately formed as a game server and a server for SNS. In addition, the server 10 may perform a part of or all of processing of a game according to the present embodiment or the terminal 20 may perform a part of the processing of the game according to the present embodiment.

The game managing unit 103 constructs a game space as a virtual space in conjunction with the terminal 20, and based on an operation by a player input via the terminal 20, executes various kinds of game processing related to various match-up games including a battle game in which a match-up among a plurality of players involves battle or hand-to-hand combat, an action game, an RPG, a sound game, and a sport game.

In addition, during execution of a match-up game, the game managing unit 103 executes game processing related to a match-up such as battle between individuals or between groups (hereinafter, referred to as an "inter-individual match-up" or an "inter-group match-up").

The movement control unit 104 controls movement inside a game space of a player character (hereinafter, also referred to as an "object player character") to be an operation object of each player to participate in a game in accordance with an operation input by the player to the terminal 20.

The game status detecting unit 105 detects, in a game in progress, a progress status of the game including the following:

(B1) respective elements associated with game process including: a time element indicating an elapsed time from the start of the game; and (B2) non-time elements like a record of a player character (a player who operates and controls the player character), a match-up record such as results of match-ups with other player characters in the case of a game involving match-ups between player characters, the number of remaining player characters or a remaining stamina level of each player character, and a positional relationship with a game field of each player character.

The area setting unit 106 executes, during a game, game area setting processing of setting a game field (in other words, a game space) in which the game is executed to a first game area and a second game area that differs from the first game area in accordance with a detected progress status of the game.

In particular, in the present embodiment, the area setting unit 106 sets the game field to the first game area and the second game area by setting the entire game field to the first game area and converting a part of the first game area into the second game area in accordance with the progress status of the game.

The display mode control unit 107 controls a display mode when a player character (hereinafter, referred to as a "first player character") who is present in the first game area and a player character (hereinafter, referred to as a "second player character") who is present in the second game area are visualized.

The timer managing unit 109 has a timer function and is used in order to manage a progress status of the game. In particular, the timer managing unit 109 works in conjunction with the game managing unit 103 and outputs a current time of day and a time of day set in advance to each unit. In addition, the timer managing unit 109 is used to synchronize with each terminal.

The information providing unit 110 generates various kinds of game information that enables the terminal 20 to process a game and provides the terminal 20 with the generated game information.

In particular, the information providing unit 110 generates information (in other words, game information) that enables a player character set by display mode control processing to be controlled by the terminal 20 concerned and provides the terminal 20 with the generated game information.

3. Terminal

Figure 3:
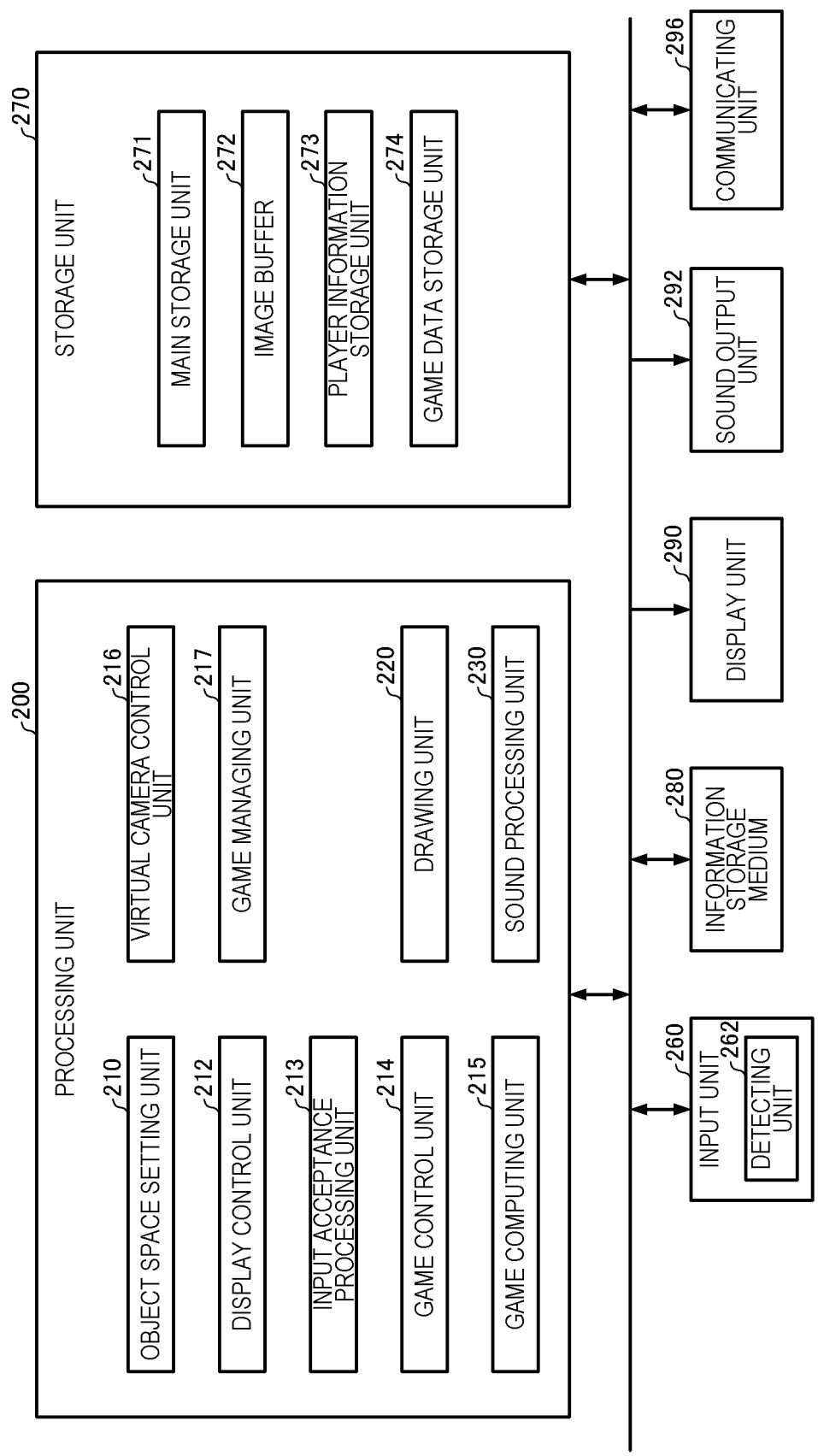
FIG. 3 is a diagram illustrating functional blocks of a terminal according to the embodiment of the invention.

Next, the terminal 20 will be described with reference to FIG. 3. Moreover, FIG. 3 is an example of a functional block diagram illustrating a configuration of the terminal according to one embodiment of the invention. Alternatively, the terminal 20 may be configured by omitting a part of the components (units) illustrated in FIG. 3.

An input unit 260 is used by a player to input operation data, and a function thereof can be realized by a touch panel, a touch panel-type display, or the like. Specifically, the input unit 260 has a detecting unit 262 capable of detecting a two-dimensional instruction position coordinates (x, y) on a screen on which an image is to be displayed. For example, the input unit 260 has the detecting unit 262 capable of detecting two-dimensional contact position coordinates (x, y) in a contact detection region (a touch panel).

It should be noted that a contact operation on a display screen (hereinafter, referred to as a "touch panel" except in special circumstances) 12 may be configured to be performed using a fingertip or performed using an input device such as a stylus.

In addition, the input unit 260 may include a button or a lever, a keyboard, a steering wheel, a microphone, an acceleration sensor, or the like which enables operation information (an operation signal) other than an instruction position to be input.

A storage unit 270 serves as a work area for the processing unit 200, a communicating unit 296, and the like, and a function of the storage unit 270 can be realized by a RAM (VRAM) or the like. In addition, the storage unit 270 includes a main storage unit 271 to be used as a work area, an image buffer 272 for storing a final display image and the like, user information 273 indicating information related to a user as a player with respect to a provided game, and a game data storage unit 274 for storing various kinds of data necessary for executing the game such as table data. Alternatively, a configuration that omits a part of these components may be adopted or the storage unit 140 of the server 10 may constitute a part of the components.

An information storage medium 280 (a computer-readable medium) stores a program, data, and the like, and a function of the information storage medium 280 can be realized by an optical disk (a CD or a DVD), a magneto-optical disk (MO), a magnetic disk, a hard disk, a magnetic tape, a memory (a ROM), or the like.

In addition, the information storage medium 280 can store a program that causes a computer to function as each unit (a program which causes a computer to execute processing of each unit) of the present embodiment. Moreover, as will be described later, the processing unit 200 performs various types of processing based on the program (data) stored in the information storage medium 280.

A display unit 290 is for outputting an image generated, and a function thereof can be realized by a CRT, an LCD, a touch panel-type display, a head-mounted display (HMD), or the like.

In particular, using a touch panel display enables the display unit 290 to also function as the input unit 260 used by a player to perform game operations. In this case, as the touch panel, a touch panel adopting a resistive system (a four-wire system or a five-wire system), a capacitance system, an electromagnetic induction system, an ultrasonic surface acoustic wave system, an infrared scanning system, or the like can be used.

A sound output unit 292 is for outputting sound generated, and a function thereof can be realized by a speaker, a headphone, or the like.

A communicating unit 296 performs various control for communicating with the outside (for example, a host apparatus or another terminal), and a function of the communicating unit 296 can be realized by hardware such as various processors or a communication ASIC, a program, or the like.

It should be noted that the terminal 20 may receive a program or data which is stored in an information storage medium or the storage unit 270 included in the server 10 and which causes a computer to function as each unit of the present embodiment via the network, and store the received program or data in the information storage medium 280 or the storage unit 270. Cases where the terminal 20 functions by receiving a program and data in this manner can also be included in the scope of the invention.

The processing unit 200 (processor) performs, in conjunction with the server 10, processing such as game processing, image generating processing, and sound generating processing based on input data, a program, or the like from the input unit 260.

In particular, in the present embodiment, game processing includes processing for starting a game when game start conditions are fulfilled, processing for advancing the game, processing for arranging objects such as a player character and other player characters, processing for displaying the objects, processing for computing a game result, and processing for ending a game when game end conditions are fulfilled.

In addition, the processing unit 200 performs various kinds of processing using the storage unit 270 as a work area. Functions of the processing unit 200 can be realized by hardware such as various processors (a CPU, DSP, or the like) and an ASIC (a gate array or the like) or by programs.

In particular, the processing unit 200 includes an object space setting unit 210, a display control unit 212, an input acceptance processing unit 213, a game control unit 214, a game computing unit 215, a virtual camera control unit 216, a game managing unit 217, a drawing unit 220, and a sound processing unit 230. Alternatively, a configuration which omits a part of these components may be adopted.

The object space setting unit 210 performs processing for arranging and setting various objects (objects constituted by primitive surfaces such as sprites, billboards, polygons, free-form surfaces, and subdivision surfaces) representing a displayed article such as an object (a player character, a mobile body, and other player characters), a movement path, a building, a tree, a column, a wall, or a map (landform) in an object space.

Specifically, the object space setting unit 210 determines a position and an angle of rotation (synonymous with orientation and direction) of an object (a model object), and arranges the object at the position (X, Y) or (X, Y, Z) at the angle of rotation (angles of rotation around the X and Y axes) or (angles of rotation around the X, Y, and Z axes).

In this case, an object space includes both a so-called virtual two-dimensional space and a virtual three-dimensional space. A two-dimensional space is a space in which, for example, an object is arranged at two-dimensional coordinates (X, Y), and a three-dimensional space is a space in which, for example, an object is arranged at three-dimensional coordinates (X, Y, Z).

In addition, when the object space is a two-dimensional space, a plurality of objects are arranged based on a priority set with respect to each of the objects. For example, processing can be performed involving sequentially arranging objects (sprites) starting with an object to be shown as if the object is located on an inward side and overlapping an object to be shown as if the object is located on a front side on top of the inward-side object.

Furthermore, by arranging an object with a large drawing size in a lower part of an image and arranging an object with a small drawing size in an upper part of the image, an object space corresponding to the upper part of the image can be shown as though located on an inward side and an object space corresponding to the lower part of the image can be shown as though located on a front side.

Moreover, when the object space is a three-dimensional space, objects are arranged in a world coordinate system.

The display control unit 212 causes the display unit 290 to display image data which is transmitted from the server 10 and which includes each player character in the game field of which a display mode is controlled.

The input acceptance processing unit 213 accepts an input instruction of a player having been input using the input unit 260 and outputs the accepted input instruction to the game control unit 214, the server 10, or both.

The game control unit 214 executes, in conjunction with the server 10, game processing based on a command accepted by the input acceptance processing unit 213.

In particular, the game control unit 214 executes control with respect to a character to be an operation object (in other words, a player character), a player character of another player, or another ancillary character based on various kinds of information about the game (game information, information related to a movement of a player character (including information related to a movement determination), and image data) transmitted from the server 10, and a command (in other words, an input instruction) accepted by the input acceptance processing unit 213.

For example, the game control unit 214 executes a predetermined operation such as supporting attack on an enemy character or supporting capability recovery of an ally character in the case of a match-up game including an action game or a shooting game and growing crops or constructing a building in the case of a simulation game.

Meanwhile, the game control unit 214 performs a movement calculation of a character object that is an operation object such as a mobile body object (in particular, a character object such as a player character or other player characters) in an object space.

In other words, in conjunction with the server 10, the game control unit 214 performs processing of moving a mobile body object in an object space or controlling an action (motion or animation) of the mobile body object based on game information transmitted from the server 10 and input data input by a player using the input unit 260 or a program (a movement algorithm), various data (motion data), or the like.

Specifically, the game control unit 214 performs simulation processing of sequentially obtaining, for every frame, movement information (a direction of movement, an amount of movement, a speed of movement, a position, an angle of rotation, or an acceleration) and action information (a position or an angle of rotation of each part object) of an object. In this case, a frame refers to a unit of time when performing movement processing or action processing (simulation processing) of an object and image generation processing. In addition, in the present embodiment, a frame rate may be fixed or may be variable in accordance with processing load.

Moreover, the game control unit 214 executes processing of moving an object based on an input direction in a three-dimensional object space. For example, the game control unit 214 associates a direction of movement with each input direction in advance and moves the object in the direction of movement corresponding to the input direction.

In addition, the game control unit 214 may execute processes in conjunction with the server 10, and a part of or all of the game control unit 214 may be formed in the server 10.

The game computing unit 215 performs a variety of processing for game computation. In particular, the game computing unit 215 performs computing processes necessary for executing a shooting game such as formation of an object space determined in advance of the game, formation of an object space based on a map, progress of the game based on a scenario set in advance in accordance with an operation by the user, a match-up with a player character, other player characters, or other objects, and management of parameters during the match-up.

Moreover, while the game computing unit 215 executes the processes in conjunction with the server 10, a part of or all of the game computing unit 215 may be formed in the server 10.

The virtual camera control unit 216 generates an image that appears to have depth of a game space visible from a given perspective. In this case, the virtual camera control unit 216 performs control processing of a virtual camera (a perspective) for generating an image that is visible from a given (an arbitrary) perspective in the object space. Specifically, the virtual camera control unit 216 performs processing of controlling a position (X, Y, Z) or an angle of rotation (angles of rotation around the X, Y, and Z axes) of the virtual camera (processing of controlling a perspective position or a perspective direction).

For example, when photographing an object (for example, a character, a ball, or a vehicle) from behind with a virtual camera, the position or the angle of rotation of the virtual camera (an orientation of the virtual camera) is controlled so that the virtual camera tracks a change in the position or a change in the rotation of the object.

In this case, the virtual camera can be controlled based on the position, the angle of rotation, the speed, or the like of the object obtained by the game control unit 214. Alternatively, control may be performed for causing the virtual camera to rotate in an angle of rotation determined in advance or causing the virtual camera to move along a movement path determined in advance. In addition, in this case, the virtual camera is controlled based on virtual camera data for specifying a position (a movement path) or an angle of rotation of the virtual camera.

Moreover, the virtual camera may be set as a perspective of a player character. Furthermore, when a plurality of virtual cameras (perspectives) are present, the control processing described above is performed with respect to each virtual camera.

In conjunction with the server 10, the game managing unit 217 sets a player character and various items to be used by each player in a game such as a match-up game or the like based on an operation by the player input via the input unit 260, and registers the player character and the various items in the user information 273.

The drawing unit 220 performs image drawing processing based on various pieces of information related to image generation transmitted from the server 10 and results of a variety of processing (game processing) performed by the processing unit 200 and, accordingly, generates an image and outputs the generated image to the display unit (display) 290.

In particular, the image generated by the drawing unit 220 may be a so-called two-dimensional image or a so-called three-dimensional image. In particular, the drawing unit 220 generates an image which is visible from a virtual camera in an object space and which is to be displayed on a screen.

When generating a two-dimensional image, the drawing unit 220 sequentially draws objects in an ascending order of set priorities, and when objects overlap with each other, the drawing unit 220 draws the object with the higher priority on top.

In addition, when generating a three-dimensional image, the drawing unit 220 first receives input of object data (model data) including vertex data (positional coordinates, texture coordinates, color data, a normal vector, an a value, or the like of a vertex) of each vertex of an object (a model), and based on vertex data included in the input object data, performs vertex processing. When performing vertex processing, vertex generation processing (tesselation, curved surface division, or polygon division) for redividing a polygon may be performed if necessary.

In addition, in vertex processing, movement processing, coordinate transformation (world coordinate transformation or camera coordinate transformation), clipping processing, perspective transformation, or geometry processing such as light source processing of a vertex is performed, and based on a processing result thereof, vertex data provided with respect to a group of vertices that constitute an object is changed (updated or adjusted). Furthermore, rasterization (scan conversion) is performed based on the vertex data after the vertex processing, and a surface of a polygon (a primitive) is associated with pixels. Following the rasterization, pixel processing (fragment processing) for drawing pixels constituting an image (fragments constituting a display screen) is performed.

In pixel processing, various processing including texture reading (texture mapping), setting/changing of color data, translucent compositing, and anti-aliasing is performed to determine a final drawing color of pixels constituting an image, and drawing colors of an object subjected to translucent composition is output (drawn) to the image buffer 272 (a frame buffer: a buffer capable of storing image information in pixel units; a VRAM or a rendering target). In other words, in pixel processing, per-pixel processing is performed in which image information (a color, a normal, brightness, an a value, or the like) is set or changed in pixel units.

Accordingly, an image viewed from a virtual camera (a given perspective) set in an object space is generated. When a virtual camera (a perspective) exists in plurality, an image can be generated so that images viewed from the respective virtual cameras are displayed on one screen as divided images.

It should be noted that the vertex processing and the pixel processing performed by the drawing unit 220 may be realized in accordance with a shader program described in a shading language by a so-called programmable shader (a vertex shader or a pixel shader) that is hardware which makes drawing processing of a polygon (a primitive) programmable. With a programmable shader, making processing in vertex units and processing in pixel units programmable increases a degree of freedom of contents of drawing processing and significantly improves expressiveness as compared to static drawing processing by hardware.

A lock-on processing unit (not shown) executes lock-on processing in which an object satisfying a lock-on condition such as a condition where an object at a close distance from a player character is preferentially selected or a condition where an object close to a central axis when crosshairs are trained is determined (locked-on) as a selection object is preferentially selected from a plurality of objects that appear in a game space.

In addition, when drawing an object, the drawing unit 220 performs geometry processing, texture mapping, hidden surface removal processing, a blending, and the like.

In geometry processing, processing such as coordinate transformation, clipping processing, perspective projection transformation, or a light source calculation is performed with respect to the object. In addition, object data (a positional coordinate, a texture coordinate, color data (brightness data), a normal vector, an a value, or the like of vertices of an object) after the geometry processing (after the perspective projection transformation) is stored in the storage unit 270.

In texture mapping, processing of mapping a texture (a texel value) stored in a texture storage unit of the storage unit 270 to an object is performed. Specifically, using a texture coordinate or the like set (added) to a vertex of an object, a texture (surface properties such as a color (RGB) and an a value) is read from the texture storage unit of the storage unit 270 and the texture that is a two-dimensional image is mapped to an object. In this case, processing for associating pixels and texels with each other and bilinear interpolation or the like as interpolation of texels are performed.

It should be noted that, in the present embodiment, processing of mapping a given texture may be performed when drawing an object. In this case, a color distribution (a texel pattern) of the texture to be mapped can be dynamically changed.

In addition, in this case, a texture with a different color distribution (a pixel pattern) can be dynamically generated, or a plurality of textures with different color distributions may be prepared in advance and a texture to be used may be dynamically switched to another texture. Furthermore, the color distribution of a texture may be changed in object units.

In the hidden surface removal processing, hidden surface removal processing according to Z-buffering (a depth comparison method, a Z test) using a Z-buffer (a depth buffer) is performed in which a Z-value (depth information) of a drawing pixel is stored. Specifically, when drawing a drawing pixel corresponding to a primitive of an object, the Z-value stored in the Z-buffer is referenced and the referenced Z-value of the Z-buffer and a Z-value in the drawing pixel of the primitive are compared with each other, and when the Z-value in the drawing pixel is a Z-value to the front as viewed from the virtual camera (for example, a smaller Z-value), drawing processing of the drawing pixel is performed and, at the same time, the Z-value of the Z-buffer is updated to a new Z-value.

In a blending (a compositing), the drawing unit 220 performs translucent compositing processing (straight a blending, additive a blending, or subtractive a blending) based on an a value (an A value). It should be noted that the a value is information that can be stored in association with each pixel (texel, dot) and is, for example, additional information other than color information. The a value can be used as mask information, translucency (equivalent to transparency and opacity), bump information, and the like.

In addition, the drawing unit 220 may generate an image to be displayed in a display region corresponding to a contact detection region. The image to be displayed in the display region may be, for example, an image including an object.

The sound processing unit 230 performs sound processing based on results of a variety of processing performed by the processing unit 200, generates game sounds including a BGM, a sound effect, and voices, and outputs the game sounds to the sound output unit 292.

4. Method 4.1. Overview

Figure 4:
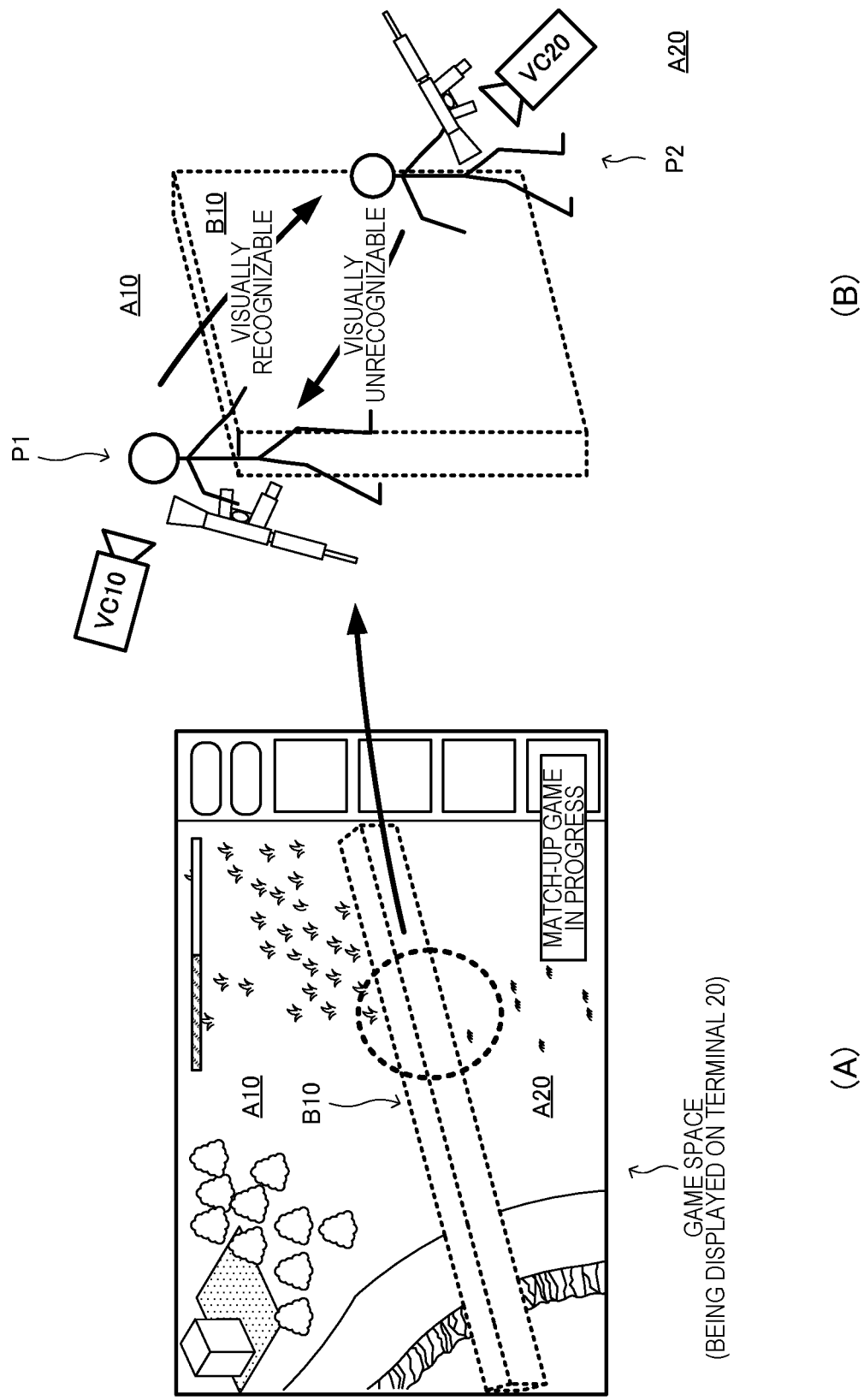
FIG. 4 is a diagram for explaining display mode control processing including game area conversion processing according to the embodiment of the invention.
Figure 5B:
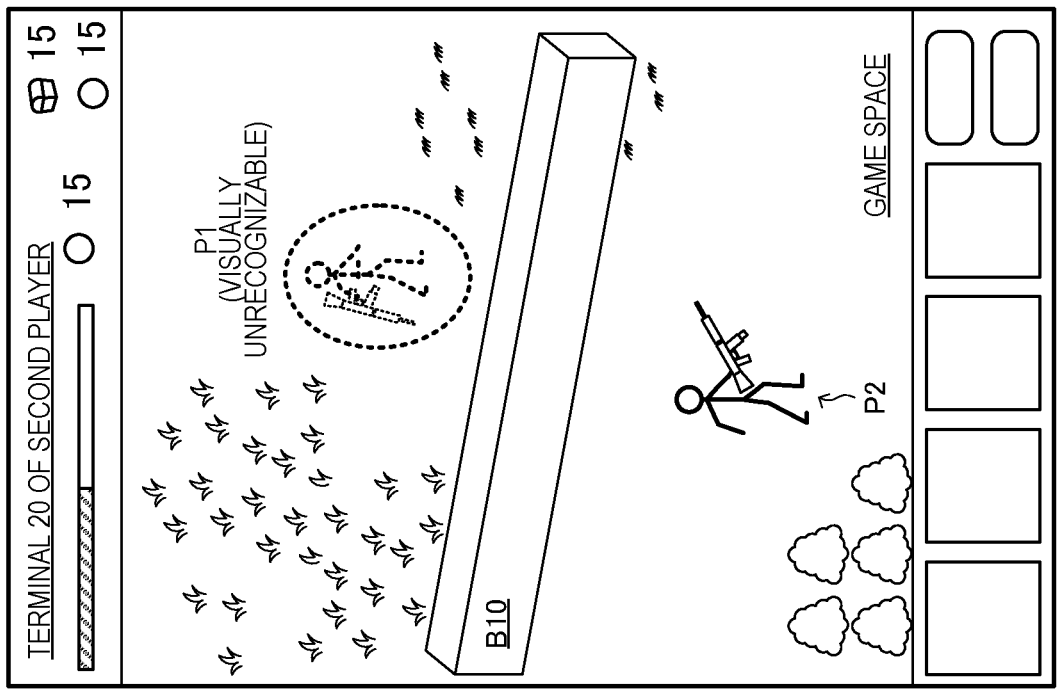
FIGS. 5A and 5B are, respectively, diagrams for explaining the display mode control processing including game area conversion processing according to the embodiment of the invention.
Figure 5A:
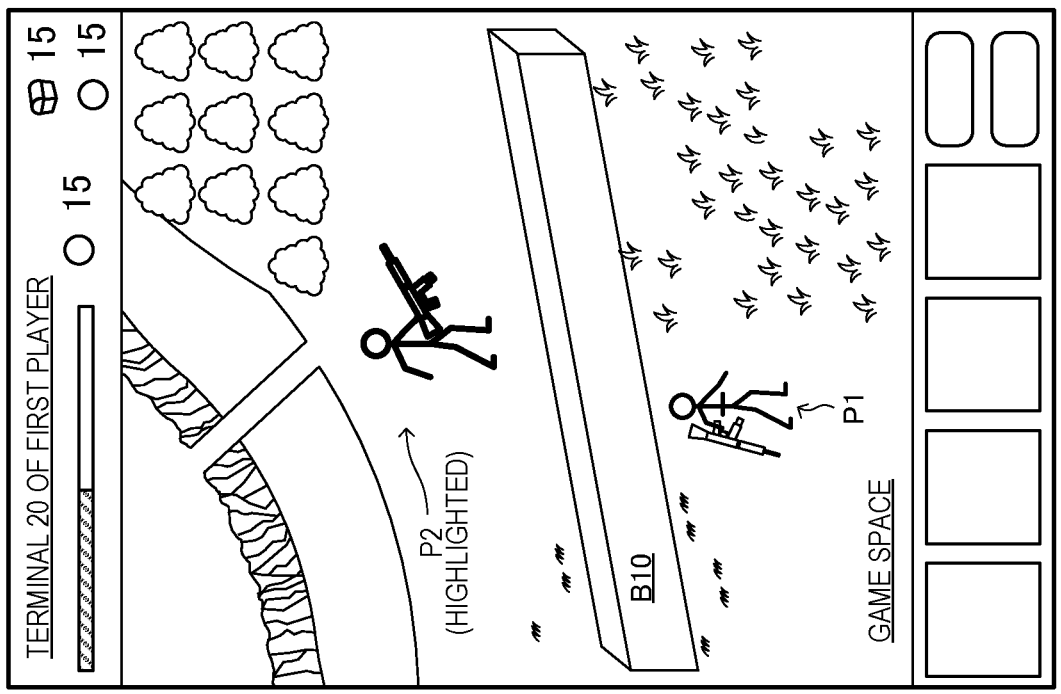

Next, an overview of a method (display mode control processing including game area conversion processing) according to an embodiment of the invention will be described with reference to FIGS. 4, 5A and 5B. FIGS. 4, 5A and 5B are diagrams for explaining the display mode control processing including game area conversion processing according to an embodiment of the invention.

For example, in conjunction with the terminal 20 operated by each player, the server 10 is configured to form a single game space (in other words, a game field constituted by a virtual three-dimensional space) and execute a match-up game such as a shooting game or an action game involving a plurality of player characters respectively operated and controlled by each player in the game field.

In addition, the server 10 is configured to execute a game involving the movement of the plurality of player characters in the game field formed in the virtual space and provide the terminal 20 with information related to the game including an image (hereinafter, also referred to as a "game image") of a visualized game space.

Furthermore, the server 10 is configured to:
(1) set the game field to a first game area and a second game area in accordance with a progress status of a match-up game during the game; and
(2) execute display mode control processing of changing, as a result of an acquisition of an item or an improvement of skill level, a display mode of each player character which is reflected in accordance with a progress status of the game or an intention of an operation by a player depending on whether the player character is present in the first game area or the second game area.

In particular, the server 10 is configured to control, in the display mode control processing, when causing the terminal 20 of a player (hereinafter, referred to as a "first player") who operates a first player character who is present in the first game area to display a second player character who is present in the second game area, a display mode of the second player character to a display mode that differs from a display mode in which the first player character is displayed on the terminal 20 of a player (hereinafter, referred to as a "second player") who operates the second player character.

Specifically, the server 10 is configured to execute:
(A1) game area setting processing of setting a game field to a first game area and a second game area that differs from the first game area in accordance with a progress status of a game;
(A2) display mode control processing of controlling a display mode when a first player character who is present in the first game area and a second player character who is present in the second game area are visualized;
(A3) image generating processing of visualizing the inside of a virtual space as a game image and generating image data for providing the terminal 20 with the game image including the controlled display mode of each player character; and
(A4) provision processing of providing the terminal 20 concerned with the generated image data.

In addition, the server 10 is configured to execute, in the display mode control processing, processing of causing the terminal 20 of the first player to display the second player character in a first display mode and causing the terminal 20 of the second player to display the first player character in a second display mode that differs from the first display mode.

In particular, the server 10 is configured to cause the second game area to function as penalty area for imposing a penalty on a player or a player character when the player character is present in the second game area.

Furthermore, in the display mode control processing, the server 10 is configured to:
(B1) perform display control of the first player character who is present in a first game area A10 in, based on settings of a game and an environment of a game space, a display mode which reflects an intention of a player and which is set based on an instruction by the player (in other words, a normal display mode without special display processing which is displayed in accordance with the environment of the game); and
(B2) when displaying the second player character who is present in the second game area on the terminal 20 of the first player, control a display mode of the second player character to a display mode that imparts a disadvantage to the second player (in other words, a display mode with special display processing).

For example, as illustrated in FIGS. 4, 5A and 5B, the server 10 is configured to:
(C1) when displaying a second player character P2 who is present in a second game area A20 such as a penalty area on the terminal 20 of the first player, display the second player character P2 so as to be visible to the first player or highlight the second player character P2; and
(C2) when displaying a first player character P1 who is present in an area outside of a penalty area such as a first game area A10 on the terminal 20 of a second player, set the first player character P1 so as to be unrecognizable to the second player or display the first player character P1 so that recognition thereof is difficult.

FIG. 4 illustrates an example for describing the display mode control processing in a case where the second game area A20 including the second player character P2 is visualized and displayed on the terminal 20 of the first player by arranging a virtual camera VC10 for the first player at a position of the first player character P1 and a case where the first game area A10 including the first player character P1 is visualized and displayed on the terminal 20 of the second player by arranging a virtual camera for the second player at a position of the second player character P2.

In addition, FIG. 5A illustrates an example of a game image displayed on the terminal 20 of the first player when visualizing the game space from obliquely above the first player character P1 in which the second player character is highlighted.

Furthermore, FIG. 5B illustrates an example of a game image displayed on the terminal 20 of the second player when visualizing the game space from obliquely above the second player character P2 in which the first player character is made unrecognizable (although the first player character is depicted by a dotted line in the drawing, in reality, the first player character is not visualized).

According to this configuration, in the present embodiment, by imparting a disadvantage to a player character who is present in the second game area such as a penalty area, the player character can be psychologically induced to avoid staying inside the penalty area and can be guided to the first game area that is outside of the penalty area or the like.

In addition, according to the present embodiment, for example, since gradually decreasing the first game area enables a range of activity of a player character to be narrowed and, consequently, a large number of match-up opportunities between player characters can be created, the game system described above can invigorate a game and enhance an entertainment level thereof by controlling display modes based on areas.

Furthermore, in the present embodiment, for example, since an attack can be deliberately launched from the second game area while enjoying the disadvantage based on being present in the second game area instead of being uniformly moved to the first game area, each player is enabled to construct a game strategy with a high degree of freedom and, as a result, a range of entertainment when playing the game can be expanded and the game's appeal can be enhanced.

Therefore, in the present embodiment, since each player is enabled to construct a game strategy with a high degree of freedom including implementing a match-up using the second game area, a range of entertainment when playing the game can be expanded and the game's appeal can be enhanced.

It should be noted that, in the present embodiment, game area setting processing will be described using conversion processing (hereinafter, referred to as "game area conversion processing") of setting an initial game field as the first game area and subsequently converting a part of the first game area into the second game area.

In addition, in the present embodiment, a player character may be a character who is operated by a player or an NPC (a non-player character) who is controlled in accordance with game processing by a program or the like and who is not controlled by a player.

4.2. Game Area Conversion Processing

Figure 6:
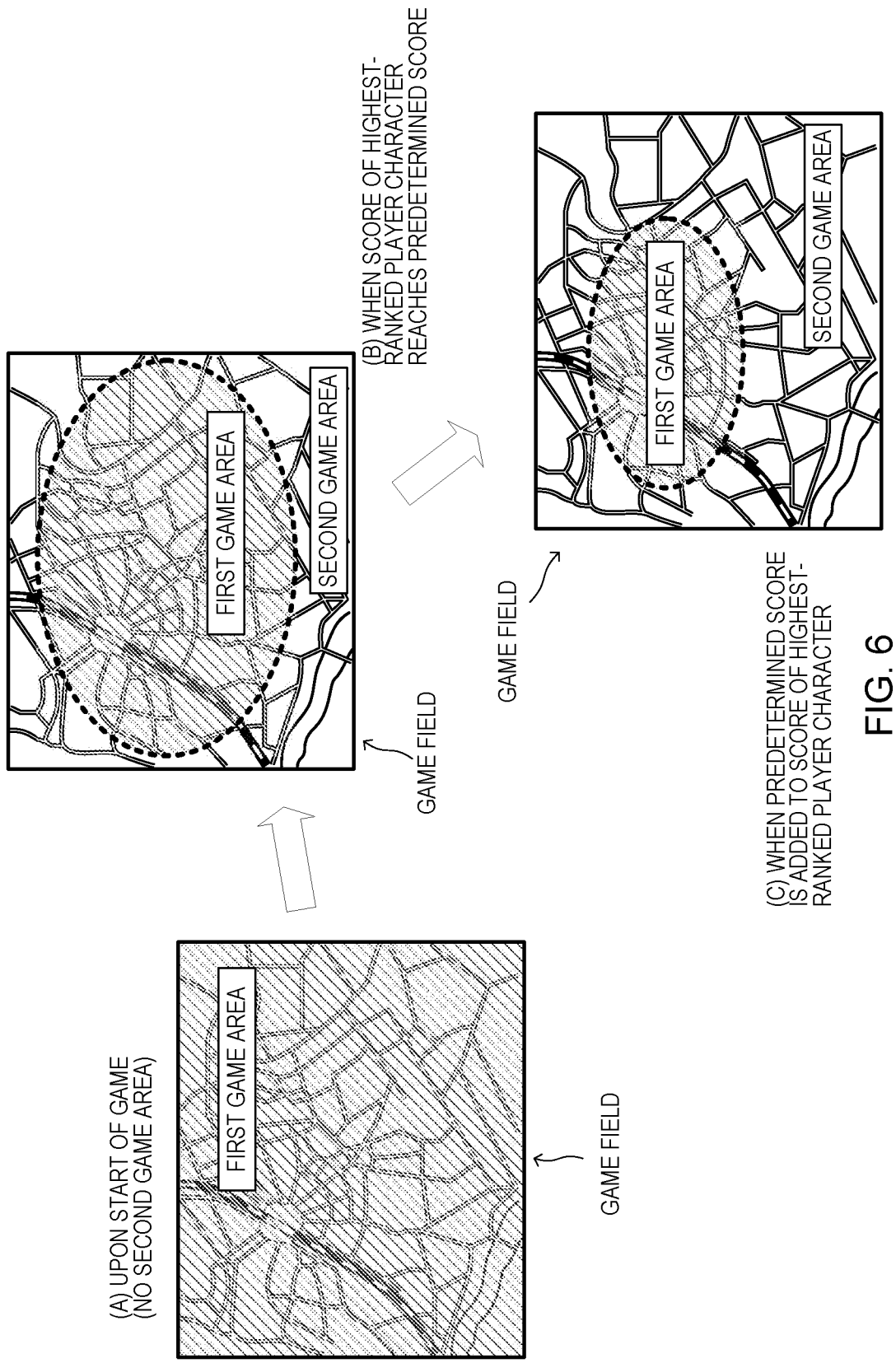
FIG. 6 is a diagram for explaining game area conversion processing that is executed in accordance with a progress status of a game according to the embodiment of the invention.
Figure 7B:
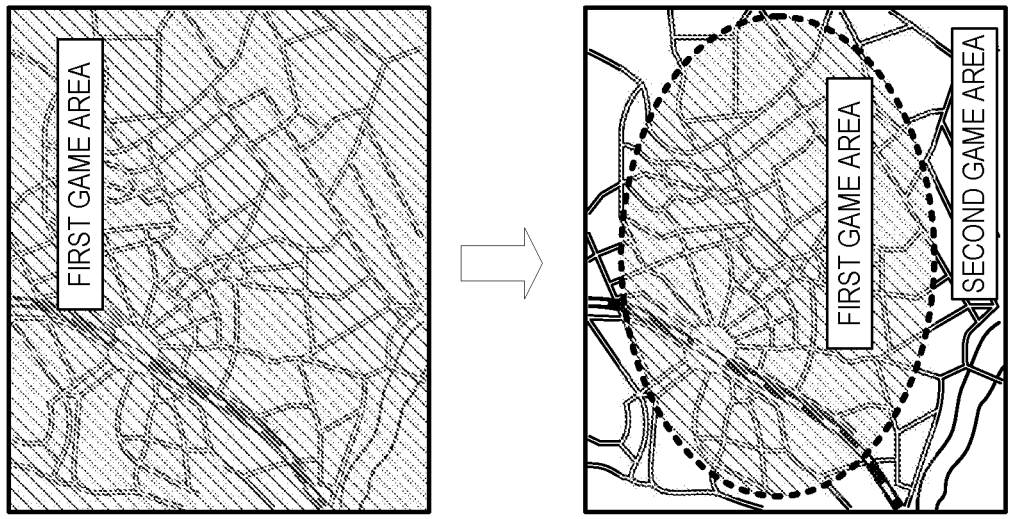
FIGS. 7A and 7B are, respectively, diagrams for explaining the game area conversion processing that is executed in accordance with a progress status of a game according to the embodiment of the invention.
Figure 7A:
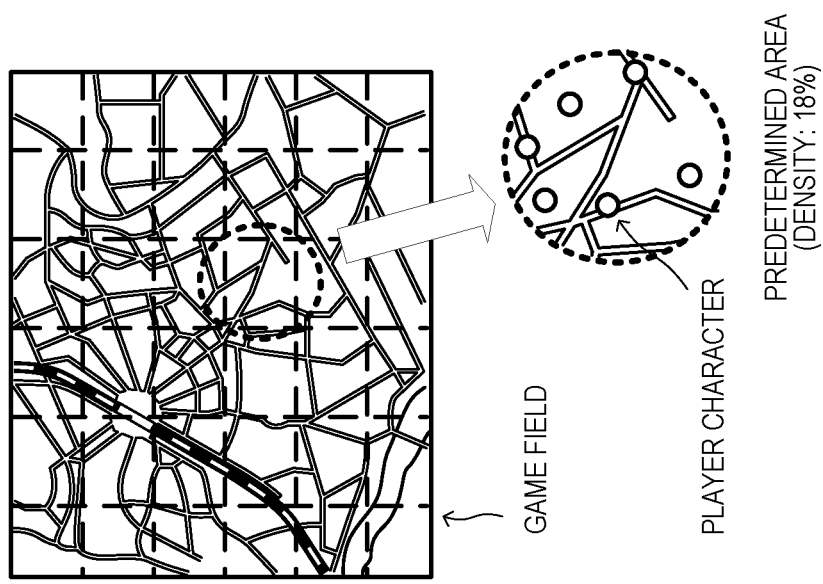

Next, game area conversion processing that is executed in accordance with a progress status of a game according to an embodiment of the invention will be described with reference to FIG. 6 and FIGS. 7A and 7B. FIG. 6 and FIGS. 7A and 7B are diagrams for explaining game area conversion processing that is executed in accordance with a progress status of a game according to an embodiment of the invention.

4.2.1. Detection of Progress Status of Game

When the game is in progress, the game status detecting unit 105 detects a time element such as an elapsed time from the start of the game, a non-time element which is related to the game and which differs from the time element, or both.

Specifically, the game status detecting unit 105:
(A1) detects, in conjunction with the timer managing unit 109, a timing at which a predetermined period of time elapses (every time 5 minutes elapses) from the start of the game as a time element;
(A2) reads player information of each player from the player information storage unit 146 at a given timing and, based on the read information, detects at least any game element of an element indicating a record related to the game of a player character, an element indicating a match-up record of the player character, and an element based on a position of the player character in a game field as a non-time element; or
(A3) detects both a time element and a non-time element.

In particular, based on affiliation information and record information related to the game of each player character (in other words, each player) which is included in the player information read as the non-time element of (A2), the game status detecting unit 105 specifies the following and detects the specified information and the like as an element indicating a record related to the game of the player character:
(A2-1) specifies a score of a highest-ranked player character or a score of a highest-ranked team; or
(A2-2) specifies a rank of each player and a rank of each individual in each team or a rank of each team and specifies a score difference between specific ranks (for example, between the highest rank and second place or between the highest rank and a lowest rank).

It should be noted that the game status detecting unit 105 may detect, based on affiliation information and record information or based on affiliation information, match-up record information, and record information of each player character which is included in the read player information, the following information as an element indicating a match-up record of the player character:

(B1) the number of wins of the highest-ranked player character;
(B2) the number of player characters (or enemy characters) defeated in match-ups by each player character; or
(B3) a loss by a specific player character other than a specific player character or player characters having appeared in the game field.

In addition, together with at least one of the record information and the match-up record information, the game status detecting unit 105 may detect a status of an element based on a position of at least one player character or positions of a plurality of player characters.

For example, as a position of at least one player character or positions of a plurality of player characters or an element based on these positions, the game status detecting unit 105 detects information such as the following:
(C1) a density of player characters in a predetermined area of the game field or an average of densities when the game field is divided into a plurality of areas;
(C2) the number of occurrences of match-ups in a predetermined area of the game field or an average of the numbers of match-ups when the game field is divided into a plurality of areas;
(C3) a ratio of player characters who do not move in the game field for a predetermined period of time (a degree of stall) in a predetermined area of the game field or an average of ratios of player characters who do not move in the game field for a predetermined period of time (degrees of stall) when the game field is divided into a plurality of areas;
(C4) a ratio of teams having gained an achievement (such as a large number of wins) in team match-ups in a predetermined area of the game field, whether or not a team has defeated a specific enemy character, or an average of ratios of teams having gained the achievement of the ratio of teams when the game field is divided into a plurality of areas; or
(C5) an emergence of an area where no player characters are present.

4.2.2. Principle of Game Area Conversion Processing

As described above, during a game, the area setting unit 106 executes game area setting processing of converting the first game area as a game field into the second game area in accordance with a detected progress status of the game.

Specifically, the area setting unit 106:
(D1) sets, at the start of the game, a game field (in other words, a game space) in which the game is to be executed to the first game area; and
(D2) gradually converts the first game area into the second game area in accordance with a progress status of the game.

For example, every time a certain time elapses, the area setting unit 106 may convert a certain proportion of the first game area into the second game area, or determine a change rate of the first game area in accordance with a detected progress status of the game and change a range of the first game area which has already been set to the second game area based on the determined change rate.

As the game area conversion processing, the area setting unit 106 may change (for example, deformation, movement, a combination thereof, or in combination with reduction) the range of the first game area in accordance with the detected progress status of the game and set the outside of the first game area as the second game area.

In addition, for example, the area setting unit 106 may convert a part of the first game area into the second game area in accordance with the detected progress status of the game based on a setting condition such as the following:

(E1) include the part of the first game area in a game area in which a movement by a player character (including a team (hereinafter, the same description applies)) with a high record, level, or the like or a player character with a high achievement is essential or a game area which is disadvantageous to a player concerned such as an area which the player character concerned has an aversion to (for example, an adverse area from the perspective of terrain, environment, or capability);

(E2) include the part of the first game area in a game area in which a movement by a player character with a low record, level, or the like or a player character with a low achievement is not essential or a game area which is advantageous to the player concerned such as an area which the player character concerned has an affinity with (for example, an affinitive area from the perspective of terrain, environment, or capability);

(E3) include the part of the first game area in an area other than a game area congested with player characters or a game area with a large number of occurrences of contacts; or (E4) include the part of the first game area in a game area where contacts between player characters have stalled.

For example, in accordance with the progress status of the game detected as described above, the area setting unit 106 sets an area reduced from a range that has already been set as the first game area and sets an area enlarged from a range that has already been set as the second game area.

In particular, in accordance with the detected progress status of the game, the area setting unit 106 reduces, in stages, the range of the first game area from a range that has already been set (in other words, enlarges the range of the second game area from a range that has already been set).

For example, when using record information related to a game as a non-time element as described above, as illustrated in FIG. 6, the area setting unit 106 converts a part of the first game area into the second game area so that the first game area gradually deceases from an outer side toward an inner side of the game field once the score of the highest-ranked player character reaches a predetermined score (for example, 100,000 points) and, subsequently, every time a predetermined number of points (for example, 10,000 points) is added thereto.

In addition, for example, when using positional information or positional history information as the non-time element as described above, once a density of player characters in a predetermined area of the game field reaches a predetermined density (for example, 20% or lower) as illustrated in FIG. 7A, the area setting unit 106 converts a part of the first game area into the second game area so that the first game area gradually deceases from the outer side toward the inner side of the game field as illustrated in FIG. 7B.

In this case, for example, the area setting unit 106 subsequently converts a part of the first game area into the second game area so that the first game area gradually deceases from the outer side toward the inner side of the game field every time the density of the predetermined area decreases (for example, every time the density decreases by 3%).

Furthermore, in the present embodiment, the game field, the first game area, and the second game area may be continuously formed areas or may be formed by a plurality of discontinuous areas that resemble enclaves.

4.3. Display Mode Control Processing

Figure 8:
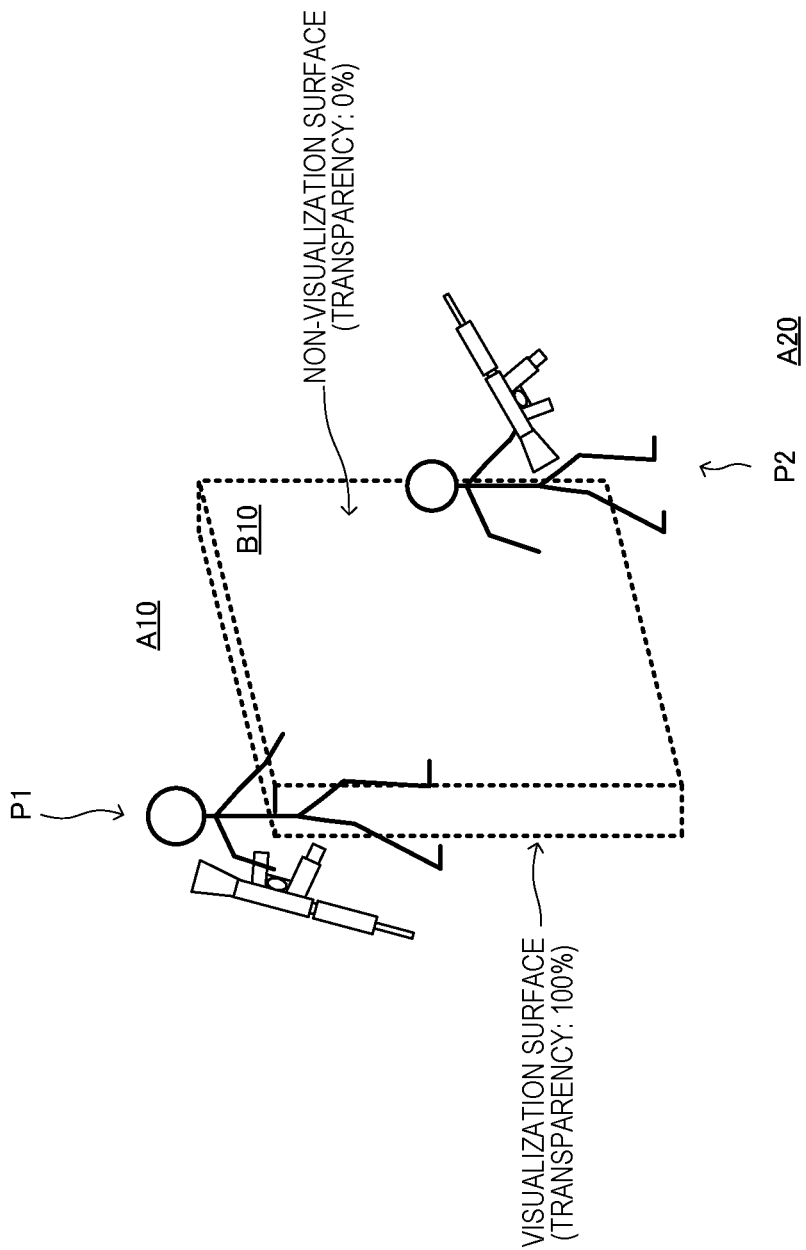
FIG. 8 is a diagram for explaining display mode control processing (arrangement control and characteristic control of a boundary object) according to the embodiment of the invention.

Next, display mode control processing according to an embodiment of the invention will be described with reference to FIGS. 8 to 11B. FIGS. 8, 9A, and 9B are diagrams for explaining the display mode control processing (arrangement control and characteristic control of a boundary object), and FIGS. 10A, 10B, 11A, and 11B are diagrams for explaining the display mode control processing (display processing of a player character).

4.3.1. Principle of Display Mode Control Processing

As the display mode control processing, the display mode control unit 107 controls a display mode when a first player character who is present in a first game area and a second player character who is present in a second game area are visualized in accordance with a type of a player to be provided with data (in other words, image data) of a game image that visualizes a game space.

In other words, the display mode control unit 107 executes the display mode control processing that causes:

(A1) the second player character to be displayed in a first display mode on the terminal 20 of a first player who operates the first player character; and (A2) the first player character to be displayed in a second display mode that differs from the first display mode on the terminal 20 of a second player who operates the second player character.

In particular, the display mode control unit 107 changes a display mode of each player character which is reflected based on a progress status of the game or an intention of an operation by a player as a result of an acquisition of an item or an improvement of skill level of a player character to a display mode that is advantageous or disadvantageous to the player in accordance with a type of a player to be provided with the image data as well as whether the player character is present in the first game area or the player character is present in the second game area.

Specifically, when displaying a second player character who is present in the second game area such as a penalty area on the terminal 20 of the first player, the display mode control unit 107 executes the display mode control processing in a penal display mode (hereinafter, also referred to as a "penalty display mode") by displaying the second player character so as to be visible to the first player or by highlighting the second player character.

On the other hand, when displaying the first player character who is present in an area outside of a penalty area such as the first game area on the terminal 20 of the second player, the display mode control unit 107 sets the first player character so as to be unrecognizable to the second player or displays the first player character so that recognition thereof is difficult.

In addition, for example, the display mode control unit 107 realizes the display mode control processing by:

(B1) processing of arranging and controlling a boundary object at a boundary between the first game area and the second game area and changing characteristics thereof; or (B2) processing of controlling, when visualizing a game space that belongs to another game area beyond the boundary between the first game area and the second game area, a display mode of a player character who is present in the other game area.

4.3.2. Specific Example 1 of Display Mode Control Processing: Arrangement Control and Characteristic Control of Boundary Object The display mode control unit 107 may arrange and control a boundary object at the boundary between the first game area and the second game area and execute the display mode control processing using the boundary object.

In particular, the display mode control unit 107 executes control of a display mode of a player character using a concept of an object constructing a game space and, for example, controls the second player character who is present in the second game area to a display mode which leaves the second player character with a disadvantage or controls the first player character who is present in the first game area to a display mode which leaves the first player character with an advantage without performing complicated processing.

Specifically, when a player character inside the game space is visualized through the boundary object, the display mode control unit 107 changes characteristics of the boundary object on a boundary surface to control the display mode of each player character in accordance with a type of a game area in which the player character to be visualized is present and a type of a player who uses the terminal 20 to be provided with a visualized game image.

In other words, the boundary object is formed by a boundary surface having characteristics for controlling a display mode of a player character inside a virtual space when the player character is visualized through the boundary object by a virtual camera or the like, and the display mode control unit 107 executes the display mode control processing by controlling characteristics of the boundary surface.

In addition, in accordance with a type of the game area and a type of a player described above, the display mode control unit 107 controls the characteristics of the boundary surface between the first game area and the second game area such as transparency of the boundary surface, a color (RGB) of the boundary surface, and characteristics for highlighting a target object itself or a contour thereof when visualizing the target object via the boundary surface.

For example, as illustrated in FIG. 8, at a boundary surface between the first game area A10 and a second game area A20, the display mode control unit 107 arranges and controls a boundary object B10 which resembles an one-way mirror and which is formed of a visualization surface having transparent characteristics (transparency of 100%) from a side of the first game area toward a side of the second game area and a non-visualization surface having opaque characteristics (transparency of 0%) from the second game area side toward the first game area side.

With respect to characteristics of the boundary surface, while the boundary surface may have one characteristic as a whole as described above, the boundary surface may alternatively be formed by a plurality of divided regions and the characteristics may be controlled by controlling each divided region.

In this case, for example, the display mode control unit 107 individually controls a divided region in accordance with an operation based on a player or controls a display mode for each portion of a player character such as always applying the display mode to only a part of the divided regions, and executes control for interlocking the display mode with a match-up game in a change of an individual divided region.

Specifically, in this case, a surface along the boundary surface between the first game area and the second game area of the boundary object is formed by a plurality of divided regions.

In addition, when a player character inside the game space is visualized through the boundary object, the display mode control unit 107 executes control to change characteristics of the boundary object by controlling each divided region in accordance with a type of a player character to be visualized and a type of a player who uses the terminal 20 to be provided with a visualized game image.

Furthermore, the display mode control unit 107 sets a parameter for each divided region and controls each divided region by controlling each parameter in accordance with a type of the player character to be visualized and a type of a player who uses the terminal 20 to be provided with a visualized game image.

Moreover, as control of the divided regions, the display mode control unit 107 executes control of transparency (grayscale), control of color (RGB), control of size, and control of shape in each divided region.

In addition, as control of the divided regions, the display mode control unit 107 executes highlighting of an object (including a player character) to be a target object itself or a contour of the object in accordance with a type of the object for each divided region in place of or in addition to the control of transparency (grayscale), the control of color (RGB), the control of size, and the control of shape.

For example, as illustrated in FIG. 9A, at the boundary surface between the first game area A10 and the second game area A20, the display mode control unit 107 arranges and controls a boundary object 300 which resembles an one-way mirror, which is a transparent object from a side of the first game area A10 toward a side of the second game area A20 and an opaque object from the second game area A20 side toward the first game area A10 side, and which is divided into a plurality of rectangular regions such as square regions with a predetermined size.

In this case, in order to give an advantage to not only the first player but also the second player in accordance with conditions of the second player character P2, the display mode control unit 107 individually controls a parameter set for each of the plurality of rectangular regions (hereinafter, also referred to as "divided regions") B20 in accordance with a progress status of a game and executes control of transparency (grayscale), control of color (RGB), control of size, and control of shape of each divided region from the second game area A20 side toward the first game area A10 side.

In particular, as illustrated in FIG. 9B, the display mode control unit 107 controls characteristics such as transparency of a non-visualization surface of a divided region concerned in accordance with a given condition such as the lapse of a predetermined period of time from setting the second game area.

In addition, FIG. 9B illustrates an example of a case where, when the given condition (for example, after 5 minutes elapses from setting the second game area) is satisfied, transparency of divided regions of a middle level is set to 50% and transparency of divided regions of upper and lower levels is set to 10% among nine divided regions B20 of the boundary object B10.

4.3.3. Specific Example 2 of Display Mode Control Processing: Display Processing of Player Character The display mode control unit 107 may execute processing of the display (in other words, display processing) of a visualized player character by superimposing and displaying an object for highlighting a location of the player character on the player character to control the display mode of the player character (in particular, the second player character).

In particular, the display mode control unit 107 executes control of a display mode of a player character by image processing such as marking and controls a player who is present in the second game area to a display mode which leaves the player with a disadvantage without performing complicated processing.

Specifically, as a first display mode, the display mode control unit 107 controls the display mode when visualizing the second player character by superimposing a marking object for marking the second player character on the second player character.

Figure 10B:
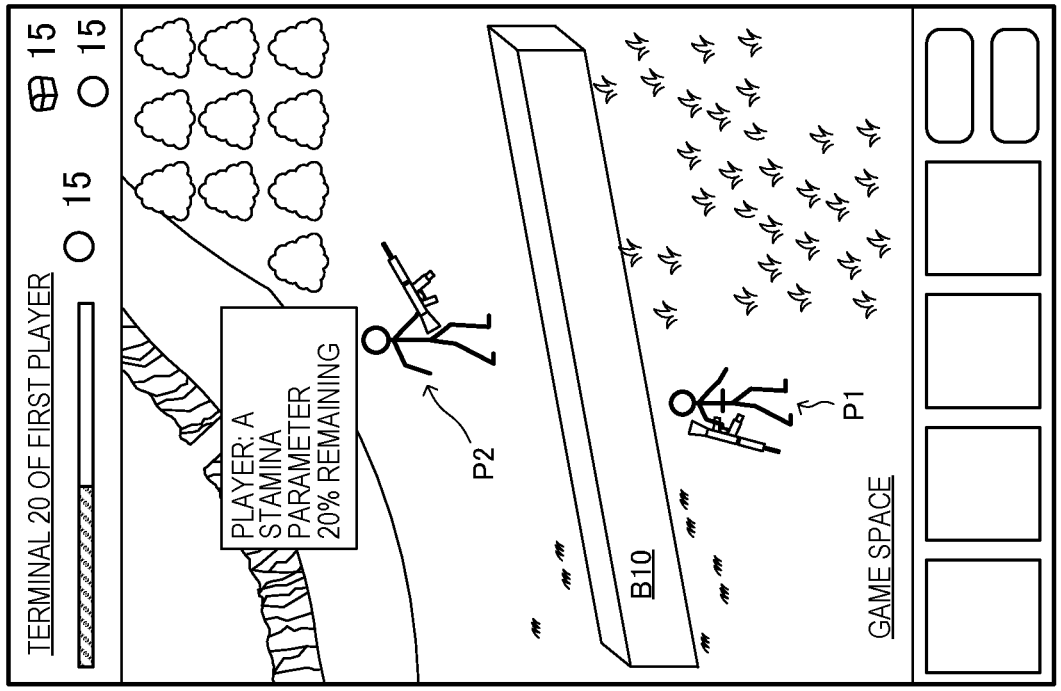
FIGS. 10A and 10B are, respectively, diagrams for explaining display mode control processing (display processing of a player character) according to the embodiment of the invention.
Figure 10A:
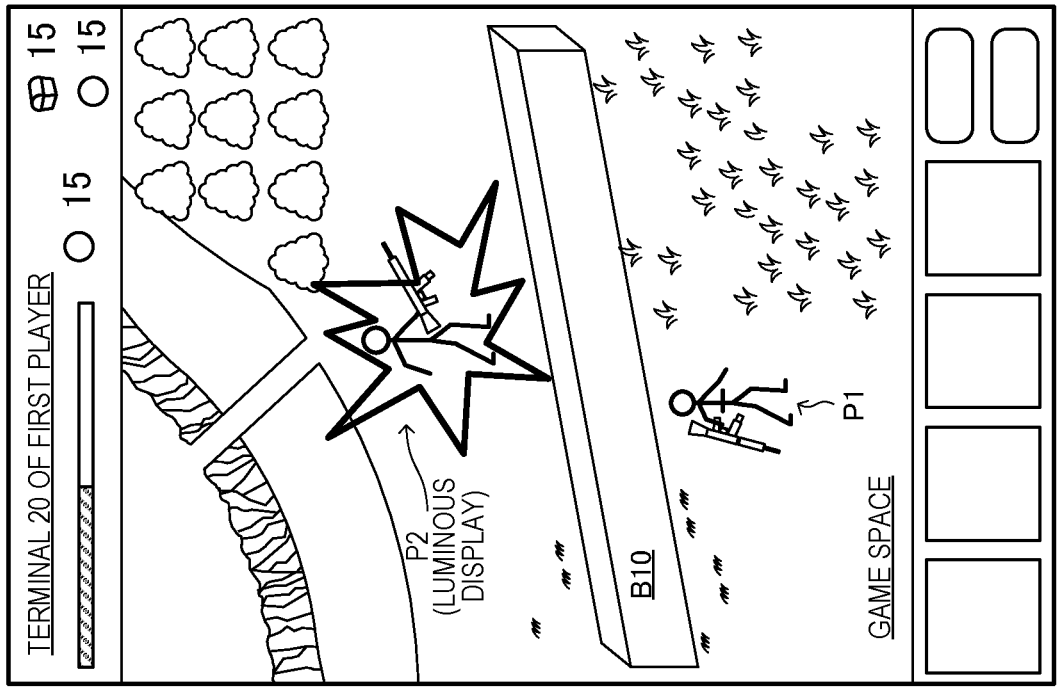

In addition, as illustrated in FIGS. 10A and 10B, the display mode control unit 107 uses the following as the marking object:

(B1) simply an object like a luminous body; or
(B2) an object for displaying information related to a parameter (such as a stamina level), information related to the number of lives or the number of remaining units, or information related to characteristics of a player or a player character such as equipment, items, and capabilities.

It should be noted that FIG. 10A illustrates a case where a luminous second player character is displayed on the terminal 20 of the first player, and FIG. 10B illustrates a case where information of a parameter of a remaining stamina level is displayed as an object on the terminal 20 of the first player.

4.3.4. Display Mode Control Processing of Third Player Character

The display mode control unit 107 may execute display mode control processing of causing the terminal 20 of the first player who operates the first player character or the second player who operates the second player character to display a third player character who differs from both the first player character and the second player character in a third display mode that differs from both the first display mode and the second display mode.

In other words, the display mode control unit 107 displays the third player character who is another player character being present in the first game area or another player character being present in the second game area in a display mode that differs from the first display mode and the second display mode.

Figure 11B:
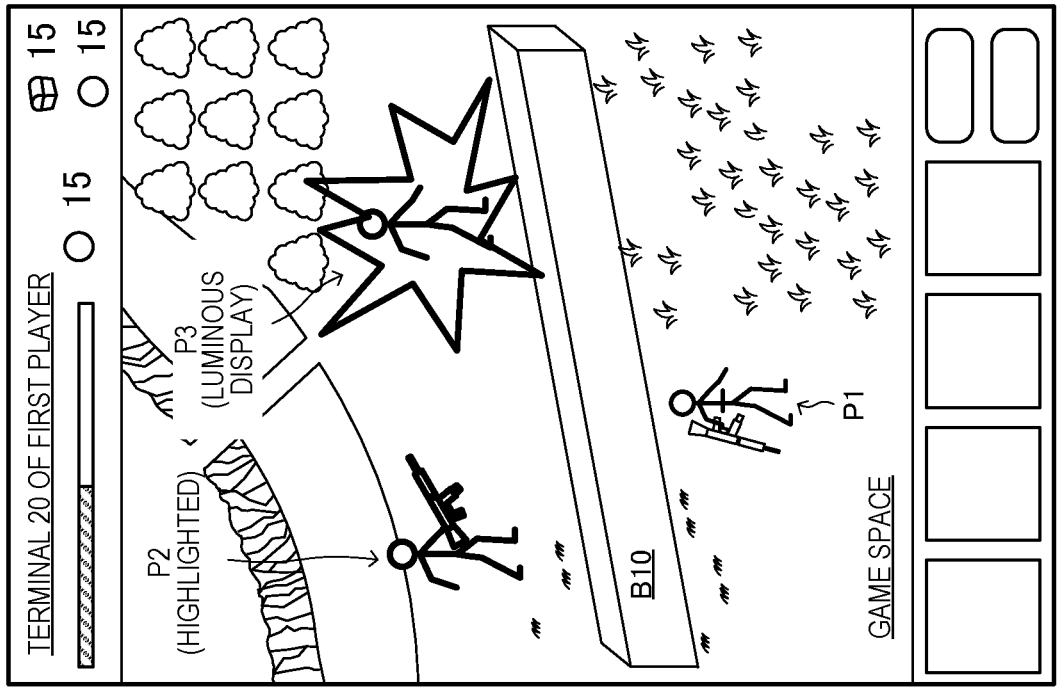
FIGS. 11A and 11B are, respectively, diagrams for explaining the display mode control processing (display processing of a player character) according to the embodiment of the invention.
Figure 11A:
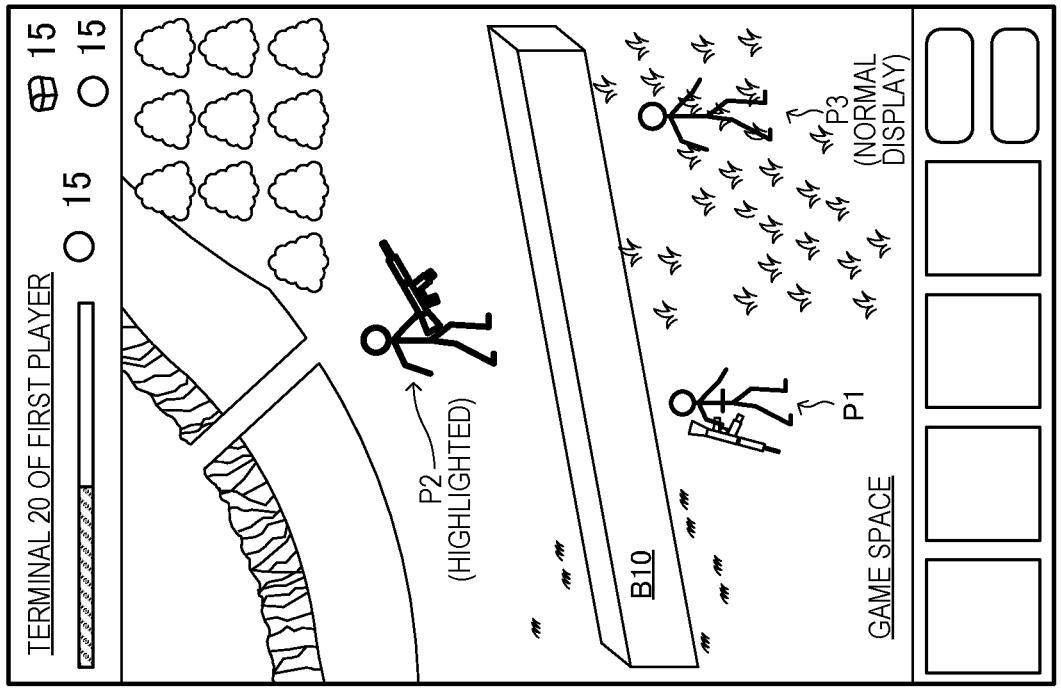

For example, when the third player character is present in the first game area as illustrated in FIG. 11A, the display mode control unit 107 causes the terminal 20 of the first player to display the third player character in a display mode that reflects an intention of a player who operates the third player character in accordance with game progress (in other words, a normal display mode without special display processing which is displayed in accordance with a game environment).

On the other hand, for example, when the third player character is present in the second game area as illustrated in FIG. 11B, the display mode control unit 107 causes the terminal 20 of the first player to display the third player character in a display mode (for example, luminous display) which imposes a disadvantage similar to that of the second player character and which differs from the display mode of the second player character.

When the third player character is present in the first game area and the terminal 20 of the second player is caused to display the third player character, the display mode control unit 107 may display the third player character in a display mode (for example, a mode in which a display object indicating a player character name is superimposed and displayed) which differs from the first display mode.

In addition, even when the third player character is present in the second game area, when the terminal 20 of the first player is caused to display the third player character, the display mode control unit 107 may display the third player character in the second display mode.

4.4. Generation and Provision of Image Data

The information providing unit 110 visualizes the inside of a game space as a game image, generates image data for providing the terminal 20 with the game image including a controlled display mode of each player character, and provides the terminal 20 concerned with the generated image data.

In particular, as image data, the information providing unit 110 provides the terminal 20 of a player concerned with a game image generated so as to reflect the display mode control processing described above from a perspective of a virtual camera arranged inside the game space for each player character.

4.5. Modifications 4.5.1. Display Mode Control Processing on Basis of Interference with Divided Region of Boundary Object Next, display mode control processing based on interference with a divided region of a boundary object according to a modification of the embodiment described above will be described with reference to FIGS. 12A, 12B, 13A, and 13B.

FIGS. 12A, 12B, 13A, and 13B are diagrams for explaining display mode control processing based on interference with a divided region of a boundary object according to a modification of an embodiment of the invention.

The game status detecting unit 105 may detect interference (in particular, interference using a second player character) with each divided region of a boundary object such as an attack on the boundary object by each player.

In addition, the display mode control unit 107 may control characteristics of each divided region of the boundary object based on the detected interference with each divided region by each player.

In other words, the display mode control unit 107 is configured to be capable of individually controlling the characteristics of a divided region or controlling only the characteristics of a part of the divided regions in accordance with an operation based on a player.

Specifically, the game status detecting unit 105 detects an action that changes the characteristics of the boundary object or a part thereof or an action history (including an action for changing a parameter that directly or indirectly determines the characteristics of the boundary object or a part thereof or an action history) such as the following:

(A1) an action that damages the boundary object or a part thereof such as a contact or an attack on the boundary object or a part thereof by a player character (for example the second player character who is present in the second game area) himself/herself or an item used by the second player character, and the use of magic;

(A2) an approach by the first player character or the second player character who is present in the first game area to a boundary (in other words, a distance between a boundary object and a player character);

(A3) a change in an environment (in other words, an environment parameter) of a periphery of a specific boundary object in conjunction with an action by a player character (specifically, when a parameter that determines characteristics of a boundary object is changed due to an environment parameter) such as a case where the player character penetrates into the second game area and continuously remains in the second game area, and night falls in the game space; or (A4) a change in a parameter set in advance and related to a boundary object in relation to an action (in particular, a movement) of a player character such as a case where a parameter that determines characteristics set to the boundary object changes due to the player character repetitively penetrating into the second game area from the first game area via a same boundary area (which may be same coordinates or a predetermined coordinate range that is regarded to be the same in a game space).

In addition, for example, the display mode control unit 107 specifies a divided region that has been damaged or affected by an attack or the like or a divided region approached by a player character to within a certain distance, and controls characteristics of the specified divided region.

In particular, in accordance with an attack force (a hit point) when sustaining an attack, a power of influence (a power-of-influence parameter) when subjected to an influence, or a distance to a player character, the display mode control unit 107 changes transparency (grayscale), color (RGB), size, shape, and characteristics for highlighting of a player character to be a target object himself/herself or a contour of the player character in accordance with a type of the player character to control a display mode of each player character.

For example, as illustrated in FIG. 12A, a case will be assumed in which is arranged a boundary object which prevents a first player character who is present in the first game area from being visually recognized from the terminal 20 of the second player of the second player character.

In this case, as illustrated in FIG. 12B, when the divided region B20 comes under fire from the second player character P2, the game status detecting unit 105 determines whether or not the divided region B20 has been destroyed based on the hit point due to the gunfire and a defense force parameter set to the divided region B20 and specifies a destroyed divided region B20B.

In addition, when the first player character P1 is included in the first game area A10 to be visualized via the divided region B20B that has been destroyed, the display mode control unit 107 controls the first player character P1 to a display mode which displays the first player character P1 so as to be visible on the terminal 20 of a player who operates the second player character P2.

In a similar manner, for example, as illustrated in FIG. 13A, a case will be assumed in which is arranged a boundary object that prevents a first player character who is present in the first game area A10 from being visually recognized from the terminal 20 of the second player of the second player character P2.

In this case, as illustrated in FIG. 13B, the game status detecting unit 105 detects a distance between a specific item (for example, a tip of a gun) in the possession of the second player character and the divided region B20B and determines whether or not the detected distance (hereinafter, referred to as a "detected distance") satisfies a condition determined in advance (for example, whether or not the detected distance is equal to or shorter than a distance determined in advance), and specifies the divided region of which the detected distance has satisfied the condition.

In addition, with respect to a divided region having satisfied the condition, when the first player character is included in a game space to be visualized via the divided region, the display mode control unit 107 controls the first player character to a display mode which displays the first player character so as to be visible on the terminal 20 of a player who operates the second player character.

FIGS. 13A and 13B illustrate an example of a case where transparency "0 (non-visualized)" is maintained when the detected distance is L1 while the condition is satisfied and transparency reaches 100% when the detected distance is L2.

4.5.2. Movement of First Game Area (Second Game Area)

Next, a movement of the first game area will be described with reference to FIG. 14. FIG. 14 is a diagram for explaining game area setting processing (movement) that is executed in accordance with a progress status of a game.

The area setting unit 106 may move at least a part of the first game area and the second game area in accordance with the progress status of the game which is detected as described above.

In particular, the area setting unit 106 moves, in stages, a range of the first game area from a range having been already set in accordance with the detected progress status of the game in a similar manner to the game area conversion processing of executing the reduction described above.

For example, when using record information related to a game, as illustrated in FIG. 14, the area setting unit 106 sets the first game area and the second game area so that the first game area is gradually moved from a city central portion (a central portion centered on a station) toward the outskirts of the city once the score of the highest-ranked player character reaches a predetermined score (for example, 100,000 points) and, subsequently, every time a predetermined number of points (for example, 10,000 points) is added thereto.

Figure 15B:
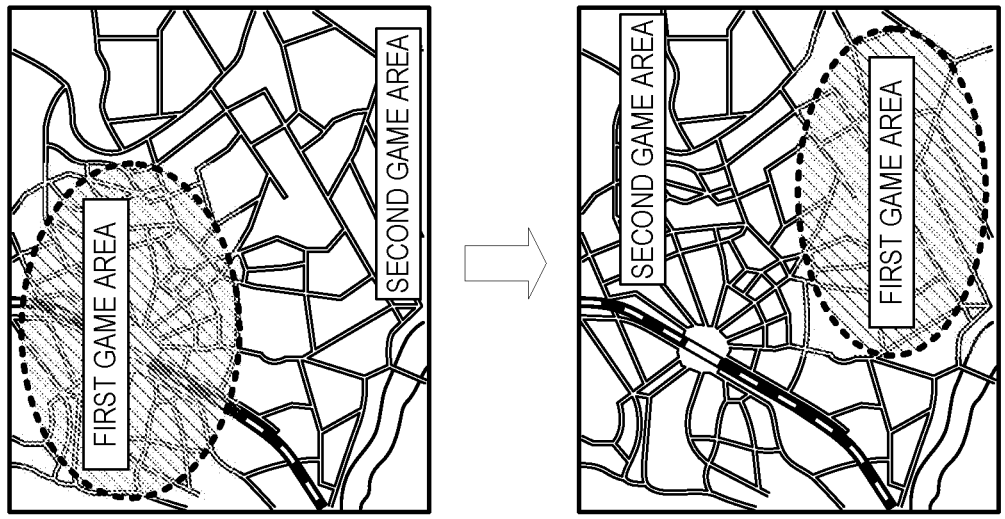
FIGS. 15A and 15B are, respectively, diagrams for explaining the game area setting processing (movement) that is executed in accordance with a progress status of a game according to the modification of the embodiment of the invention.
Figure 15A:
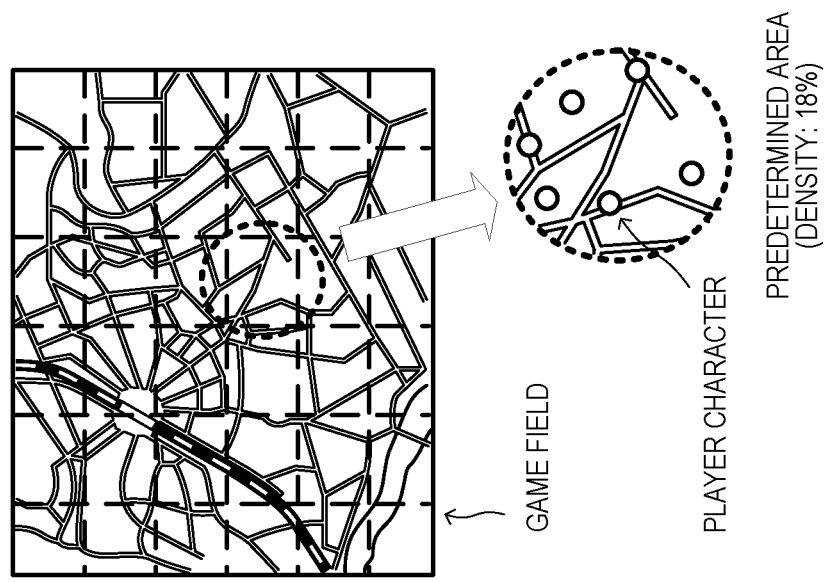

In addition, for example, when using positional information, once a density of player characters in a predetermined area of the game field reaches a predetermined density (for example, 20% or lower) and, subsequently, every time a predetermined density (for example, 3%) decreases as illustrated in FIGS. 15A and 15B, the area setting unit 106 sets the first game area and the second game area so that the first game area is gradually moved from a city central portion (a central portion centered on a station) toward the outskirts of the city as illustrated in FIG. 15B.

On the other hand, in accordance with the detected progress status of the game and based on a given setting condition, the area setting unit 106 may set an area having been moved from a range that has already been set as the first game area and may set other ranges as the second game area.

Specifically, in accordance with the detected progress status of the game, the area setting unit 106 may move and set the first game area so that the first game area becomes:

(B1) a game area in which a movement by a player character with a high record, level, or the like or a player character with a high achievement is essential or a game area which is disadvantageous to a player concerned such as an area which the player character concerned has an aversion to;

(B2) a game area in which a movement by a player character with a high record, level, or the like or a player character with a high achievement is not essential or a game area which is advantageous to a player concerned such as an area which the player character concerned has an affinity with;

(B3) a game area in which a movement by a player character with a low record, level, or the like or a player character with a low achievement is not essential or a game area which is advantageous to the player concerned such as an area which the player character concerned has an affinity with;

(B4) a game area congested with player characters or a game area with a large number of occurrences of contacts; or (B5) a game area other than a game area where contacts between player characters have stalled.

On the other hand, when moving the first game area, the area setting unit 106 may determine a movement distance by which the first game area is to be moved in accordance with the detected progress status of the game, and move the first game area from a range that has already been set based on the determined movement distance.

In other words, in this case, for example, when using a difference between ranks of player characters in record information related to the game, the area setting unit 106 determines the movement distance by which the first game area is to be moved such that the larger the difference, the longer the movement distance.

4.5.3. Display Mode Control Processing Involving Performing Special Display (Aim-Assist Display)

When the second player character is displayed on the terminal 20 of a player of the first player character (when a virtual camera is arranged at a perspective of the first player character and the second player character is included in a game space having been visualized by the virtual camera via a boundary object), the display mode control unit 107 may execute display mode control processing of performing special display (aim-assist display) of the second player character.

Specifically, in this case, as the special display, the display mode control unit 107 may generate image data for:

(C1) displaying the second player character in a changed display size (for example, 5 times a normal size) at a position where the second player character is present in a main screen of the terminal 20 on which the game space has been visualized; or (C2) creating a new window at a position where the second player character is present in the main screen and displaying (zoom-displaying) an enlargement of the second player character or a part thereof having a required size inside the window.

In addition, the game managing unit 103 may execute, in conjunction with the lock-on processing unit (not shown) of the terminal 20 concerned, lock-on processing in which crosshairs are automatically trained on a position where the second player character is arranged and a specific player character concerned is selected (specifically, a selection for attack) while displaying an image of the crosshairs (reticle) (hereinafter, referred to as a "crosshair image").

4.5.4. Provision of Advantageous/Disadvantageous Action on Basis of Sound or Disappearance of Field-Forming Object The game managing unit 103 may provide the first player with an advantage or provide the second player with a disadvantage using sound or based on disappearance of an object formed on a game field (in other words, a field-forming object) in place of, or in addition to, a disadvantage provided to the second player or an advantage provided to the first player by the display mode control processing described above.

For example, as a disadvantage with respect to the second player character who is present in the second game area or the second player, the game managing unit 103 executes generation of sound that is larger than sound generated in the first game area such as footsteps or gunshots, disappearance of an object present up to then in the second game area such as a building or vegetation which may be helpful when hiding from other players (also including cases where an object itself does not disappear but, when attacked by another player character, the object ignores the attack or, in other words, disappearance of only a hit check), and the like.

On the other hand, as an advantageous action with respect to the first player character who is present in the first game area or the first player, the game managing unit 103 executes generation of sound that is smaller than sound normally set in the game with respect to the second player such as footsteps or gunshots or creates a muted state, disables attacks from the second player character, and the like.

5. Operations

Next, operations of the display mode control processing including area conversion processing which is executed by the server 10 according to an embodiment of the invention will be described with reference to FIG. 16.

Figure 16:
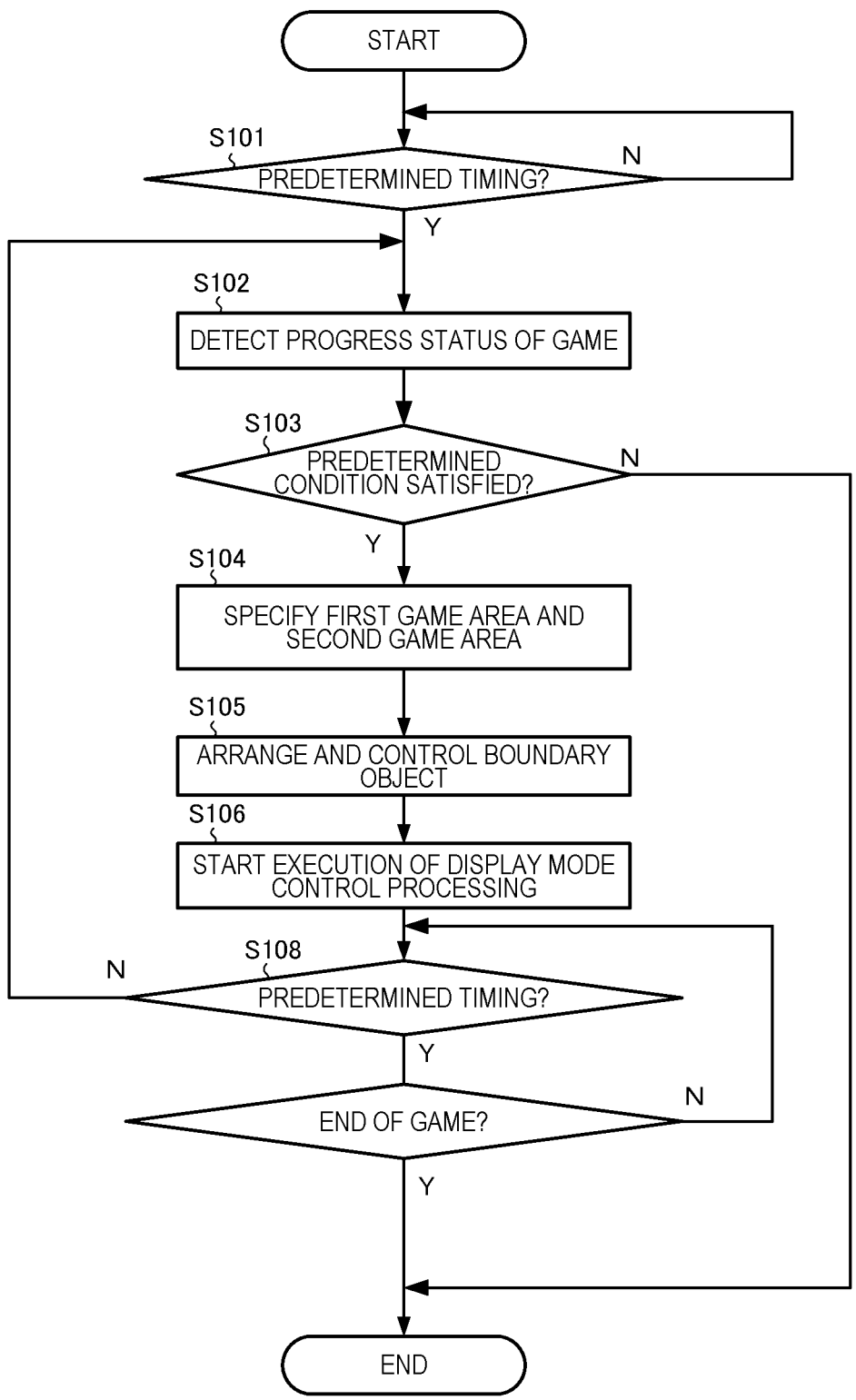
FIG. 16 is a flow chart illustrating operations of display mode control processing accompanied by game status detection processing and game area conversion processing which is executed by a server according to the embodiment of the invention.

FIG. 16 is a flow chart illustrating operations of the display mode control processing including area conversion processing which is executed by the server 10.

The operations are operations executed after the start of a game, and it is assumed that the game has already been started and an entire game field has been set to the first game area at the start of the game.

In addition, the operation is explained as follows, using the display mode control processing based on a boundary object. Further, it is assumed that, in the operations, necessary player information of each player has already been registered in the player information storage unit 146 and the player information is updated from time to time.

First, when the game status detecting unit 105 detects that a predetermined timing has arrived (step S101), the game status detecting unit 105 detects a progress status of a game being executed (step S102).

Next, the area setting unit 106 determines whether or not the detected progress status of the game satisfies a predetermined condition (step S103), and when it is determined that the condition is not satisfied, the area setting unit 106 ends the operations.

Specifically, the area setting unit 106 determines whether or not a predetermined period of time has elapsed, whether or not the detected game progress status of a player character has made a predetermined change, or the like.

On the other hand, when the area setting unit 106 determines that the detected progress status of the game satisfies the predetermined condition, the area setting unit 106 specifies ranges of the first game area and the second game area in accordance with the detected progress status of the game (step S104).

Next, the display mode control unit 107 arranges a boundary object at a boundary surface between the first game area and the second game area (step S105).

It should be noted that, at this point, the display mode control unit 107 resets various pieces of information related to a display mode being executed by previous display mode control processing.

Next, when visualizing a game space of another game area via the arranged boundary object and when the first player character or the second player character is included in the game space to be visualized, the display mode control unit 107 starts execution of display mode control processing of displaying the first player character or the second player character in the first display mode or the second display mode (step S106).

At this point, in conjunction with the display mode control unit 107, the information providing unit 110 generates image data including the display mode of each player character executed by the display mode control unit 107 by visualizing a game space with a virtual camera as a reference for each terminal 20, and transmits the generated image data to the terminal 20 concerned.

Finally, the game status detecting unit 105 detects whether or not a predetermined timing has arrived (step S107), and determines whether or not an instruction to end the game has been issued (step S108).

At this point, the game status detecting unit 105 repetitively executes step S107 and step S108, and when the game status detecting unit 105 detects the arrival of the predetermined timing during the repetitive execution of the processes, the game status detecting unit 105 makes a transition to the processing of step S102 and ends the operations when determining that an instruction to end the game has been issued.

6. Other

The invention is not limited to the embodiments described above and various modifications can be made thereto. For example, any term cited with a different term having a broader meaning than or the same meaning as the term at least once in the description or the drawings may be replaced by the different term in any place in the description or the drawings.

While the embodiments described above is explained using a match-up game, the embodiments described above can also be applied in other games such as an RPG and a simulation game if they include use of a match-up game format.

In addition, in an embodiment of the invention, terminals 20 may be provided with each game by a single server 10 or a plurality of servers 10 may operate in conjunction with one another to construct a server system to provide the terminals with each game.

Furthermore, while a game provided by the server 10 is being executed by the terminal 20 in the embodiment described above, the game described above may be realized by having the server 10 execute each function of the processing unit 200 of the terminal 20 with the exception of operation input and execute a game program and having the terminal 20 execute operation input and image display by streaming.

In addition, the embodiment of the invention may be realized by a single game apparatus having the functions of the server 10 or, in other words, an apparatus (stand-alone) which operates independently without relying on other devices such as a server and, in this case, a plurality of input terminals need only be available.

Furthermore, such a game terminal may be connected in plurality in a wired or wireless manner, and a single game apparatus can be realized by a plurality of game apparatuses o function as the server 10.

Moreover, while the game system according to the invention is applied to the server 10 which executes the game system in conjunction with the terminal 20 via a network in the embodiment described above, the game system can also be applied as a tablet-type information terminal, a personal computer, or a game apparatus installed at an amusement park.

The invention includes configurations that are substantially the same (for example, in function, method, and results, or in objective and effects) as the configurations described in the embodiments. The invention also includes configurations in which non-essential elements described in the embodiments are replaced by other elements. The invention also includes configurations having the same effects as those of the configurations described in the embodiments, or configurations capable of achieving the same objectives as those of the configurations described in the embodiments. The invention further includes configurations obtained by adding known art to the configurations described in the embodiments.

Some embodiments of the invention have been described in detail above, but a person skilled in the art will readily appreciate that various modifications can be made from the embodiments without materially departing from the novel teachings and effects of the invention. Accordingly, all such modifications are assumed to be included in the scope of the invention.

What is claimed is:

1. A game system which executes a match-up game between players using a plurality of player characters in a game field formed in a virtual space and which provides a terminal with information related to the match-up game, the game system comprising a processor programmed to, during progress of the game played by a first player who operates a first player character and a second player who operates a second player character:
   set the game field in which the game is executed to be divided into at least a first game area and a second game area, the first game area and the second game area differ in accordance with a progress status of the game;
   control a first display mode and a second display mode in accordance with the progress status of the game, wherein the first display mode controls whether the second player character who is present in the second game area is visualized and displayed on a terminal of the first player who operates the first player character, and the second display mode controls whether the first player character who is present in the first game area is visualized on the terminal of the second player who operates the second player character;
   generate image data for visualizing the virtual space as a game image and for providing the terminal with the game image including the controlled first display mode and second display mode of each of the player characters;
   provide the terminal with the generated image data;
   execute display mode control processing of causing the terminal of the first player who operates the first player character moving in the game field to display the second player character in the first display mode, and causing the terminal of the second player who operates the second player character moving in the game field to display the first player character in the second display mode that differs from the first display mode, in which the first game area and the second game area differ in accordance with the progress status of the game.

2. The game system according to claim 1, wherein
   the processor is programmed to cause the terminal of the first player or the terminal of the second player to display a third player character who differs from both the first player character and the second player character in a third display mode that differs from both the first display mode and the second display mode.

3. The game system according to claim 1, wherein
   the processor is programmed to arrange and control a boundary object at a boundary between the first game area and the second game area, and
   when at least one of the first player character and the second player character in the virtual space is visualized through the boundary object, the processor is programmed to change characteristics of the boundary object on a boundary surface to control the display mode of the first player character, the second player character, or both the first player character and the second player character in accordance with a type of the first game area in which the first player character to be visualized is present or the second game area in which the second player character to be visualized is present and whether the player is the first player or the second player who uses the terminal to be provided with a visualized game image.

4. The game system according to claim 3, wherein
   a surface along the boundary surface between the first game area and the second game area of the boundary object is formed by a plurality of divided regions, and the processor is programmed to, when at least one of the first player character and the second player character in the virtual space is visualized through the boundary object, change characteristics of the boundary object by controlling each divided region in accordance with whether the player character is the first player character or the second player character to be visualized and whether the player is the first player or the second player who uses a terminal to be provided with the visualized game image.

5. The game system according to claim 4, wherein
the processor is programmed to
  detect interference in each divided region of the first player or the second player, or an environment of the game in progress, and
  individually controls characteristics of each divided region based on the detected interference of the player or the detected environment of the game.

6. The game system according to claim 1, wherein
the processor is programmed to control the first display mode by superimposing a marking object for marking the second player character on the second player character when visualizing the second player character.

7. A method of executing a match-up game between players using a plurality of player characters in a game field formed in a virtual space and providing a terminal with information related to the match-up game, during progress of the game played by a first player who operates a first player character and a second player who operates a second player character, the method comprising:
  setting the game field in which the game is executed to be divided into at least a first game area and a second game area, the first game area and the second game area differ in accordance with a progress status of the game;
  controlling a first display mode and a second display mode in accordance with the progress status of the game, wherein the first display mode controls whether the second player character who is present in the second game area is visualized and displayed on a terminal of the first player who operates the first player character, and the second display mode controls whether the first player character who is present in the first game area is visualized on the terminal of the second player who operates the second player character;
  generating image data for visualizing the virtual space as a game image and for providing the terminal with the game image including the controlled first display mode and second display mode of each of player characters;
  providing the terminal with the generated image data; and
  executing display mode control processing of causing the terminal of the first player who operates the first player character moving in the game field to display the second player character in the first display mode, and causing the terminal of the second player who operates the second player character moving in the game field to display the first player character in the second display mode that differs from the first display mode, in which the first game area and the second game area differ in accordance with the progress status of the game.

8. The method according to claim 7, further comprising causing the terminal of the first player or the terminal of the second player to display a third player character who differs from both the first player character and the second player character in a third display mode that differs from both the first display mode and the second display mode.

9. The method according to claim 7, further comprising arranging and controlling a boundary object at a boundary between the first game area and the second game area, and
when at least one of the first player character and the second player character in the virtual space is visualized through the boundary object, changing characteristics of the boundary object on a boundary surface to control the display mode of the first player character, the second player character, or both the first player character and the second player character in accordance with a type of the first game area in which the first player character to be visualized is present or the second game area in which the second player character to be visualized is present and whether the player is the first player or the second player who uses the terminal to be provided with a visualized game image.

10. The method according to claim 9, wherein
a surface along the boundary surface between the first game area and the second game area of the boundary object is formed by a plurality of divided regions, and
further comprising, when at least one of the first player character and the second player character in the virtual space is visualized through the boundary object, changing characteristics of the boundary object by controlling each divided region in accordance with whether the player character is the first player character or the second player character to be visualized and whether the player is the first player or the second player who uses a terminal to be provided with the visualized game image.

11. The method according to claim 10, further comprising
detecting interference in each divided region of the first player or the second player, or an environment of the game in progress, and
individually controlling characteristics of each divided region based on the detected interference of the player or the detected environment of the game.

12. The method according to claim 7, further comprising
controlling the first display mode by superimposing a marking object for marking the second player character on the second player character when visualizing the second player character.

13. A game system which executes a match-up game between players using a plurality of player characters in a game field formed in a virtual space, the game system comprising a processor programmed to, during progress of the game played by a first player who operates a first player character and a second player who operates a second player character:
  set the game field in which the game is executed to be divided into at least a first game area and a second game area, the first game area and the second game area differ in accordance with a progress status of the game;
  control a first display mode and a second display mode in accordance with the progress status of the game, wherein the first display mode controls whether the second player character who is present in the second game area is visualized and displayed on a terminal of the first player who operates the first player character, and the second display mode controls whether the first player character who is present in the first game area is visualized on the terminal of the second player who operates the second player character;
  generate image data for visualizing the inside of the virtual space as a game image and for displaying the game image including the controlled first display mode and second display mode of each player character;

displaying the generated image data on display; and executing display mode control processing causing the terminal of the first player who operates the first player character moving in the game field to display the second player character in the first display mode, and causing the terminal of the second player who operates the second player character moving in the game field to display the first player character in the second display mode that differs from the first display mode, in which the first game area and the second game area differ in accordance with the progress status of the game.

14. The game system according to claim 13, wherein the processor is programmed to cause the terminal of the first player or the terminal of the second player to display a third player character who differs from both the first player character and the second player character in a third display mode that differs from both the first display mode and the second display mode.

15. The game system according to claim 13, wherein the processor is programmed to arrange and control a boundary object at a boundary between the first game area and the second game area, and when at least one of the first player character and the second player character in the virtual space is visualized through the boundary object, the processor is programmed to change characteristics of the boundary object on a boundary surface to control the display mode of the first player character, the second player character, or both the first player character and the second player character in accordance with a type of the first game area in which the first player character to be visualized is present or the second game area in which the second player character to be visualized is present and whether the player is the first player or the second player who uses the terminal to be provided with a visualized game image.

16. The game system according to claim 15, wherein a surface along the boundary surface between the first game area and the second game area of the boundary object is formed by a plurality of divided regions, and the processor is programmed to, when at least one of the first player character and the second player character in the virtual space is visualized through the boundary object, change characteristics of the boundary object by controlling each divided region in accordance with whether the player character is the first player character or the second player character to be visualized and whether the player is the first player or the second player who uses a terminal to be provided with the visualized game image.

17. The game system according to claim 16, wherein the processor is programmed to detect interference in each divided region of the first player or the second player, or an environment of the game in progress, and individually controls characteristics of each divided region based on the detected interference of the player or the detected environment of the game.

18. The game system according to claim 13, wherein the processor is programmed to control the first display mode by superimposing a marking object for marking the second player character on the second player character when visualizing the second player character.

* * * * *